US007398733B2

(12) United States Patent
De Vries et al.

(10) Patent No.: US 7,398,733 B2
(45) Date of Patent: Jul. 15, 2008

(54) INLINE MEASUREMENT AND CLOSED LOOP CONTROL METHOD IN PRINTING MACHINES

(75) Inventors: Loris De Vries, Buchs (CH); Peter Ehbets, Zürich (CH); Peter Elter, Mühlhausen (DE); Wolfgang Geissler, Bad Schönborn (DE); Werner Huber, Rauenberg (DE); Robert Lange, Netphen (DE); Frank Muth, Karlsruhe (DE); Christopher Riegel, Bruchsal (DE); Manfred Schneider, Bad Rappenau (DE); Frank Schumann, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 11/593,162

(22) Filed: Nov. 3, 2006

(65) Prior Publication Data

US 2007/0079717 A1 Apr. 12, 2007

Related U.S. Application Data

(63) Continuation of application No. PCT/EP2005/004609, filed on Apr. 29, 2005.

(30) Foreign Application Priority Data

May 3, 2004 (DE) ....................... 10 2004 021 601

(51) Int. Cl.
*B41F 3/00* (2006.01)
*H04N 1/46* (2006.01)

(52) U.S. Cl. ....................... 101/484; 358/518; 250/548; 250/559.04

(58) Field of Classification Search ................. 250/548, 250/559.01, 559.02, 559.03, 559.04; 358/518
See application file for complete search history.

(56) References Cited

U.S. PATENT DOCUMENTS

| | | | | |
|---|---|---|---|---|
| 3,756,725 | A | | 9/1973 | Manring |
| 4,003,660 | A | | 1/1977 | Christie, Jr. et al. |
| 4,428,287 | A | | 1/1984 | Greiner |
| 4,784,492 | A | | 11/1988 | Morgenstern et al. |
| 5,014,618 | A | * | 5/1991 | Zingher et al. .............. 101/365 |
| 5,662,044 | A | | 9/1997 | Löffler et al. |
| 5,724,437 | A | | 3/1998 | Bucher et al. |
| 6,041,708 | A | * | 3/2000 | Kipphan et al. ............. 101/365 |
| 6,580,524 | B1 | | 6/2003 | Weichmann et al. |
| 6,827,420 | B2 | * | 12/2004 | Campbell et al. ............. 347/19 |
| 6,975,949 | B2 | * | 12/2005 | Mestha et al. ................. 702/76 |
| 2001/0010191 | A1 | | 8/2001 | Steinbacher |

FOREIGN PATENT DOCUMENTS

| | | |
|---|---|---|
| DE | 2 150 319 | 4/1972 |

(Continued)

*Primary Examiner*—Daniel J. Colilla
*Assistant Examiner*—Marissa Ferguson-Samreth
(74) *Attorney, Agent, or Firm*—Laurence A. Greenberg; Werner H. Stemer; Ralph E. Locher

(57) ABSTRACT

Spectral, densitometric, or color measured values are detected on sheet printing materials during the printing process in a sheet-fed printing press. The measured values are determined on sheets as they are moving through the printing press and the measured values are used in real-time by a computer to control parameters for controlling the printing process in the sheet-fed printing press.

28 Claims, 13 Drawing Sheets

FOREIGN PATENT DOCUMENTS

| | | | |
|---|---|---|---|
| DE | 36 40 956 | A1 | 8/1987 |
| DE | 253 918 | A3 | 2/1988 |
| DE | 259 599 | A1 | 8/1988 |
| DE | 38 06 100 | A1 | 10/1988 |
| DE | 301 438 | A7 | 1/1993 |
| DE | 195 06 425 | A1 | 8/1996 |
| DE | 198 44 495 | A1 | 4/2000 |
| DE | 100 23 127 | A1 | 11/2001 |
| EP | 1 155 852 | A2 | 11/2001 |

* cited by examiner

INLINE MEASUREMENT AND CLOSED LOOP CONTROL METHOD IN PRINTING MACHINES

CROSS-REFERENCE TO RELATED APPLICATIONS

This is a continuing application, under 35 U.S.C. § 120, of copending international application PCT/EP2005/004609, filed Apr. 29, 2005, which designated the United States; this application also claims the priority, under 35 U.S.C. § 119, of German patent application DE 10 2004 021 601.0, filed May 3, 2004; the prior applications are herewith incorporated by reference in their entirety.

BACKGROUND OF THE INVENTION

Field of the Invention

The present invention relates to a method for detecting spectral, densitometric or color measured values on printing materials during the printing process in a printing press.

During every printing operation, the printer attempts to achieve a maximum accord between the printed copies and the original print. To this end, complicated quality control and monitoring of the printed printing materials by the printing personnel is required in a printshop operation. According to the prior art, this is carried out by means of visual assessment by the operating personnel and by the employment of optical measuring instruments, which measure either densitometrically or spectrally. For this purpose, in the case of sheet-fed offset printing presses, a sheet has to be removed from the delivery and is usually placed on a sheet supporting desk. On this desk, the sheet is illuminated with a standardized source of illumination and is measured with the aid of optical measurement technology or assessed visually. However, this process takes time, and, in addition, is made more difficult by the fact that the printing press continues to print during the quality control and, under certain circumstances, rejects arise if the assessed sheet does not correspond to expectations. Since, after each interruption to the printing process, the printing press needs a certain number of sheets until the printing process has reached a stable state again, rejects cannot be prevented either by shutting down the printing press quickly during the printing material inspection. Furthermore, in order to assess the printing sheet, printing personnel are needed who, during the quality control, are not available for other activities. Since, during the setup phase of a printing press, many possible adjustments have to be made, in particular in the inking unit area, rejects of between 150 and 400 sheets normally occur. This is made even more difficult by the fact that the printing process can generally be reproduced only with difficulty, since the printing result depends on very many parameters such as ink, temperature, water, paper, printing speed, rubber blanket, condition of the printing plate, etc. All these parameters normally change in some way from print job to print job, and it is therefore not sufficient to store the setting of a print job and to retrieve it in the same way for repeat jobs since, for example, the air temperature or atmospheric humidity could have changed in the meantime, so that, even for the same print job, new settings have to be made because of changed environmental conditions.

In the case of web-fed offset printing presses, the printed (newspaper) webs cannot simply be removed from the machine. Accordingly, there exist measuring systems which attempt to measure the quality of a printed web spectrally or densitometrically. A method for operating a sensing device for optical density measurement is disclosed in German published patent application DE 100 23 127 A1. There, the printed web which leaves the last printing unit in a web-fed offset printing press is guided over a deflection roll, a sensing device for optical density measurement, color measurement or spectral measurement being fitted parallel to the deflection roll. In this way, the quality of the printed web can be determined. In the description of the exemplary embodiments, it is indicated that the method disclosed in the application can also be applied during printing on sheet printing materials. However, an accurate description of how this is actually to be done cannot be gathered from the application, in particular the problem that, in the case of sheet printing materials, the guidance of the sheet printing materials over a deflection roll as in DE 100 23 127 A1 is not possible at all, is not solved, since sheet printing materials have to be held at least one point by a holding device such as grippers or the press nip of the printing unit. For this reason, the device disclosed in DE 123 127 A1 is not suitable for the quality assessment of sheet printing materials during the printing process in sheet-fed offset printing presses.

Furthermore, Ifra Special Report 3.35 describes inline measuring systems for web-fed rotary printing presses which operate with a closed control loop, that is to say the measured values registered by the inline measurement for assessing the printing quality of the printing material web are passed on directly to a computer of the web-fed rotary printing press and are processed there. The computer then corrects any deviations automatically and changes settings of the printing press. However, this method also inherently has the disadvantage that it is possible only to correct deviations which are permitted by the control system of the printing press. In particular, corrections to the color profile are not automatically possible in this way, since these can be made only in conjunction with the data from the prepress stage. Furthermore, in the case of the known inline measurements, only the data from a single print job, namely the specifically current print job, is taken into account when correcting the settings in the printing press.

SUMMARY OF THE INVENTION

It is accordingly an object of the invention to provide a method for inline measurement and closed-loop control processing in printing machines which overcomes the above-mentioned disadvantages of the heretofore-known devices and methods of this general type and which enables automatic correction of deviations in the printing press over a plurality of print jobs.

With the foregoing and other objects in view there is provided, in accordance with the invention, a method for detecting spectral, densitometric or color measured values on sheet printing materials during a printing process in a sheet-fed printing press wherein sheets are moved through the printing press. The method comprises the following steps:

determining the measured values on sheets moving through the printing press; and processing the measured values in a computer and using the processed values as control parameters for controlling the printing process of the sheet-fed printing press.

By way of the registration of measured data on sheets transported through the printing press, the current state of the system comprising the printing press can always be determined and, in this way, corrections can be made immediately and in real-time by a control system, which is otherwise not possible in sheet-fed printing presses. This control can be carried out during the setup phase but also during continuous printing. During continuous printing, however, corrections are necessary substantially more rarely, since here the behavior of the printing press is more stable. Therefore, in continuous printing it is not necessary to carry out so many measurements, for which reason the measuring strategy can be adapted to the respective state of the printing press. This is described in more detail further below in the text.

In an advantageous refinement of the invention, during the printing process in the printing press, not only are spectral, densitometric or color measured values registered continually on the printing materials that are being produced, but the measured values are evaluated in a computer of the printing press or a separate computer and at least those deviations which cannot be avoided accurately by changing the settings on the printing press are passed on to the control system in the prepress stage. This can be brought about relatively simply, in particular in what is known as computer to plate technology (CtP), since these digital prepress stages likewise have computers which are able to receive the corresponding data from the computer of the printing press. In this way, a closed control loop started from the finished printing material via the printing press and the prepress stage and back to the printing press again is closed. The measured values transmitted by the printing press and their assessment can thus be taken into account in the prepress stage during the production of the printing plates and it is therefore also possible to correct deviations which cannot be compensated for in the printing press on its own. It should be noted that color measured values are understood to be values in color spaces such as the Lab, the RGB or other unambiguous color spaces. Even over a plurality of print jobs, measured values can thus be taken into account during the creation of printing plates, so that, over many print jobs, a continuous improvement process takes place in the entire production chain from the scanner in the prepress stage as far as the end product in the printing press. In this way, it is possible to carry out an improvement process without having to register special test forms in a complicated process. Since, in a digital workflow as is most usual nowadays, the prepress stage with the scanners, plate exposers, raster image processors and the printing press are linked to one another, this data can also be interchanged without additional hardware and with little additional expenditure.

In a first refinement of the invention, provision is made for the measured values registered to be supplied to a computer and for the computer to use the measured values to create or correct a color profile when driving inking units of a printing press. For color reproductions that are true to an original, it is imperative to link the color profile of the printing press with the color profile of the prepress stage, in order in this way to keep deviations between the printed original and the printed end product as small as possible. By means of the data obtained by inline measurement and sent to the prepress stage, it is possible to relate the color profiles of printing press and prepress stage to one another and, in the event of any deviations, to correct the color profile of the printing press. Therefore, the color profile of the printing press is monitored and, if necessary, adapted continually and automatically without any action by the printing personnel.

In a further or alternative refinement of the invention, provision is made for there to be sensors for recording the measured values and for color calibration to be carried out at specific time intervals by means of a calibration device. Since, in the case of an inline measuring method, measured values are determined continuously, it is absolutely necessary to ensure that these measured values are comparable with one another. For such an accurate measurement, therefore, in addition to a single calibration during commissioning, regular system calibration is necessary in order to be able to take into account any heat-induced or wear-induced changes in the measured values, and aging-induced changes of illumination sources or contamination. For this purpose, the inline measuring device present in the printing press has a calibration device, which is set operating at specific intervals. In this way, it is ensured that the inline measuring system is continually recalibrated and the operation-induced deviations are avoided.

Provision is further made that, as a reference value for the calibration device, there is a calibration surface with associated color measured values which are stored in the computer. For this purpose, the measuring heads present in the inline measuring system for the spectral, densitometric or color measurement are aimed at a calibration surface at specific time intervals and recalibrated. In the measuring system, the color value of the calibration surface is known, so that the value determined by the measuring head can be compared computationally with the stored color value. If deviations occur, then the measuring electronics of the measuring head are recalibrated appropriately, that is to say a correction is made in such a way that the measured value is made equal to the color value stored in the computer. By means of this calibration, even contaminated measuring heads are able to supply measured results that can still be used at least over a relatively long time period while, without calibration, even after a relatively short time, cleaning of the entire measuring device or replacement of an aging illuminating device would be necessary.

Provision is advantageously made for the calibration surface to be white. For calorimetric reasons, the calibration measurement should ideally be carried out on a standardized white surface, for which reason the calibration surface is implemented in precisely this hue.

Provision is further made for one or more calibration surfaces to be arranged in the channel of a press cylinder in extension of the press cylindere surface. Since the inline measuring system has a plurality of measuring heads, preferably eight measuring heads in the case of 32 inking zones distributed over the width of the printing material, all the measuring heads must be set and monitored by means of calibration surfaces. However, since the lateral mobility of the measuring heads is restricted, it is not possible to move all the measuring heads to a calibration surface fitted at the side. Furthermore, it is important that the distance between calibration surface and measuring head correspond exactly to the distance between measuring head surface and printing material surface. In order to be able to fit the calibration surfaces for all the measuring heads over the entire width of the printing material, these are arranged in the channel of a press cylinder in extension of the press cylinder surface. As a result, the calibration surfaces have exactly the same spacing with respect to the measuring heads as the surface of the printing material and are not in the way during the printing operation.

In an alternative embodiment of the invention, provision is made for at least one calibration surface arranged laterally outside the press cylinder surface to be located between side wall and press cylinder. Calibration surfaces which are located in the printing channel have the greatest disadvantage that they contaminate during the printing process. On the other hand, if the calibration surface is outside the press cylinder surface, for example in the region of the side wall, it is subjected less to contaminants there. As a result, frequent cleaning operations of the calibration surface are avoided.

In a particularly advantageous refinement of the invention, provision is made for the sensors to be measuring heads and the calibration values determined by the calibration of one measuring head to be converted by means of the computer into calibration values for further measuring heads. This method is also designated transfer calibration, since all the measuring heads are not calibrated on individual calibration surfaces; instead one calibration surface arranged outside the cylinder surface, for example between side wall and press cylinder, is sufficient. This calibration surface can, however, be performed by only one of the measuring heads covering the edges of the printing material, since only these measuring heads can be moved laterally beyond the limits of the press cylinder. The other measuring heads are calibrated by means of a transfer calibration, by the entire measuring beam being moved further by a movement travel which corresponds to the spacing of the measuring heads from one another. Therefore, only a single measuring head in the edge region has to be calibrated on the calibration surface, while in the next step the measuring beam is moved by the spacing of the measuring heads, so that this first calibrated measuring head is able to register the zone of the second measuring head. This also applies in an analogous way to the further measuring heads, that is to say each measuring head then registers the measuring zone of the measuring head located beside it. During this calibration measurement, the measuring heads are aimed either at a white printing material or at a colored printed material. However, this plays no part in the progress of the calibration measurement. For instance, if the second measuring head beside the first measuring head which has been calibrated over the calibration surface is currently registering a specific blue shade, then this blue shade is registered by the first calibrated measuring head in the next step. The measured values from the first and second measuring head are then compared with one another and, if necessary, the values of the second measuring head are corrected. Therefore, the transfer calibration to the second measuring head has been concluded, and it is possible for the possibly corrected measured values from the second measuring head to be compared with the measured values from a third measuring head. This is done in exactly the same way for all further measuring heads in an iterative method, so that only a single measuring head has to be calibrated by means of a calibration surface, while all the others are calibrated in one step by means of computational comparisons.

Furthermore, provision is made for at least one calibration surface to be closed by means of a cover. By means of such a cover, the calibration surface can be protected reliably against contamination during the printing process. The cover is opened only when a calibration operation has to be carried out. Thus, the otherwise always repeated necessary cleaning of the calibration surface is dispensed with.

It has proven to be advantageous for the calibration to be carried out with the aid of an external measuring instrument. Since all the parts accommodated in the machine are susceptible to contamination and disruption, the transfer calibration can also be carried out by means of an external measuring instrument. For this purpose, on the operating desk there is a permanently installed measuring instrument or handheld measuring instrument which has its own incorporated calibration surface, calibrates itself to this surface at regular intervals and with which the printing material currently being printed is measured. Since this printing material has previously been measured by the inline measuring device and its measuring heads and removed from the printing press, the values determined thereafter with the handheld measuring instrument can be passed on directly to the measuring electronics in the measuring beam, and in this way the appropriate calibration can be carried out. Of course, the printing material can also be measured first in the unprinted state, that is to say as paper white, by using the handheld measuring instrument and then measured in the printing press by means of the measuring heads of the inline measuring device. In this way, the transfer calibration can also be carried out by using an external measuring instrument. The calibration can particularly advantageously be carried out in the print-free region directly after the grippers, since here the sheet is guided ideally and, in addition, there is always paper white present. This edge region usually has an unprinted area of 6-12 millimeters and is completely adequate for the measurement.

However, the external handheld measuring instrument can also be used for another purpose. For many reasons, the sheet is measured in the machine with the aid of a polarizing filter, which means that all the measured values are registered in a polarized manner. However, the regulation of the printing press operates with unpolarized values, since the information from the prepress stage is present only in unpolarized form, that is to say the measured values registered must be converted into unpolarized values. For this purpose, a computational relationship between polarized and unpolarized values must be stored in the printing press. This relationship can be produced with the aid of the handheld measuring instrument, which measures unpolarized. Thus, a sheet is measured once polarized with the inline measuring device in the printing press and once unpolarized and polarized outside the machine by means of a handheld measuring instrument. If this measurement is carried out over a plurality of sheets, a relationship between the polarized and the unpolarized measured values can be detected. This relationship is then stored in the computer of the printing press as a correction function, so that the values can be converted into one another at any time.

In a further refinement of the invention, provision is made for specific color values to be stored in the computer for each measuring head, the ratios between these color values being stored in the computer and a signal being output if there is a change in the stored measured value ratios. By means of such a device, the contamination of the inline measuring system is detected. Each spectrometer has a white measured value as an initialization parameter, for example when delivered. These white measured values belonging to the respective measuring heads are stored in terms of their ratios to one another for all the measuring heads. During the printing process, paper white measurements are carried out continually and the measured value ratios determined in the process are compared with the values stored in the measuring electronics. As soon as these ratios change, it being possible for certain tolerance bands to be set, this is judged to be a signal of contamination. In this case, and acoustic or visual signal is displayed to the operating personnel, whereupon cleaning of the measuring heads must be carried out.

Furthermore, provision is made for a first measuring head to register its own color zone and the color zone of a second measuring head located beside it, and for the second measuring head likewise to register its own zone and that of the first measuring head, and for the measured values registered to be compared with one another. In this way, a cross comparison between the individual measuring heads of the measuring modules of a beam-like inline measuring device in the printing press is made possible. Firstly, all the measuring heads measure a color zone on a printing material simultaneously, then the entire measuring beam is moved laterally to such an extent that each measuring head can then measure the measuring location of its neighbor. In the event that calibration is carried out correctly, these measured values must not differ from one another or differ only within quite narrow tolerance limits. However, if the measured values exhibit deviations, then it is possible as a result to conclude that there is contamination on the optics of the measuring heads.

A further possible way of discovering contamination on the measuring system results from the fact that, on at least one color zone of a measuring head, measurements are carried out on a light/dark edge, the measuring head being moved in uniform steps from one side on the other side of the light/dark edge over the light/dark edge until it is on the side on this side of the light/dark edge, and the intensity measured values registered in the process being compared with the known structure of the measuring head. Such a light/dark edge represents, for example, the transition from paper white to the colored region. This measuring region then has to be run through by a measuring head as follows. Firstly, the measuring head measures on the side of the light/dark edge which shows the paper white. The measuring beam is then, for example, moved over the width of the measuring area of the light/dark edge in 10 steps, 10 measurements being carried out. This means that the last measurement is carried out completely in the colored region of the measuring area. During the evaluation of these measurements, the intensity measured in each case is plotted against the local offset, it being necessary for the distance between the white value measured last and the color value measured first to correspond to the measuring range of the spectrometer of the measuring head, given exact optical imaging of the known structure width. This comparison is carried out by means of the measuring electronics and the values stored there of the structure of the measuring range of the spectrometer. If there is a deviation here, this is likewise an indicator of contamination.

Furthermore, provision is made for there to be an illuminating device, for a dark measurement to be carried out before the actual measurement by a measuring head and for the measured value registered in the process to be subtracted from the color measurement carried out with the illuminating device switched on. In order to be able to sense the surface of the printing material, the latter must be illuminated by using an illuminating device in the vicinity of the measuring head. However, since there is a distance of several centimeters between the printing material and the measuring beam, external light can also fall into the region between printing material and measuring head/illumating device. This falsifies the measured results and must be compensated for accordingly. One possibility is to perform a dark measurement, that is to say the illuminating device is first switched off and the measurement is carried out with the illuminating device switched off. The illumination is then switched on and the measurement is made with the illuminating device switched on. In this case, the order does not play any part, since for the purpose of correction it is merely necessary for the measured value registered during the dark measurement to be subtracted from the measured value registered with the illumination switched on. Scattered light or external light sources are, for example, slots in the machine through which the ceiling illumination of a print shop or daylight can fall, but there are also light sources in the machine itself, such as UV/IR dryers or other sensors which operate with light and whose light disrupt the measuring process. By means of a small change, it is also possible to compensate for periodically operating external light sources. For example, a dark measurement is carried out first, the influence of external light being registered for the first time, a light measurement is then carried out and then, once more, a dark measurement, during which only the influence of external light is again registered. If the external light source changes, the measured values from the two dark measurements differ from one another and, by comparing the two measured values, the computer can detect whether the external light has to be added or subtracted during the light measurement, since it is able to compare the measured values before and after. It is therefore possible for the gradient of the external light change to be determined, so that the influence of external light from the light measurement can also be computed out reliably in the event of changing, in particular periodic, external light.

A further possibility for correction in the event of incidental external light is that, at the same time as the color measurement from a first measuring head, by means of a second measuring head a measured value is registered on a white background of a printing material and the white reference value determined as a result is used to correct the color measured values determined by the first measuring head. To this end, the second measuring head must be accommodated so as to be separated physically from the first measuring head, which must always carry out the measurement on paper white. This can be, for example, the edge region of the printing material. The white reference value determined with the second measuring head is included in the calculation of the color or density values and in this way the influence of the external light is compensated for.

There is still a further possibility for external light compensation, namely that, during the registration of measured values on the printing material by means of one or more measuring heads, any light sources present are switched off, masked out or dimmed down to a non-critical level. In this case, the measuring electronics of the measuring heads are linked to the computer of the printing press, so that light sources in the printing press are switched off during the measuring operation. For example, the influence of the external light from a UV dryer is avoided during the measurement by the dryer being switched off briefly during the measurement and then switched on again. Another possibility is to mask out the external light source, by a shutter being fitted in front of the external light source. This shutter then covers the external light source as long as the measuring operation is being carried out. It is also possible to filter out specifically spectral values of the external light source which lie within the spectral range of the measuring device, by a filter being fitted which filters out the spectrum of the external light source. A similar effect is achieved by means of computational interpolation. Since the spectrum of the external light source is known, spectral values corresponding to the measuring spectrum are not used and, instead, by means of the adjacent values, the unusable values are interpolated over the spectrum of the external light source. Thus, peaks caused by the external light source in the measured spectrum can be computed out.

In order to compensate for external light, the following possibility is also provided, namely that the registration of measured values by measuring heads with any fluctuations of light sources are coordinated over time by means of at least one sensor which registers the fluctuations, or by means of a control signal of the fluctuating light source. In this case, too, information about the time behavior of the external light source must be available, that is to say these values must either be stored in a computer or the external light source supplies the information online to the computer via sensors. In this case, the measurements are coordinated by the computer in such a way that measurements are always made when the external light source is switched off or exhibits a minimum.

Furthermore, provision is made for a plurality of measuring heads to be distributed at equal intervals over the width of a printing material and to register the color zones simultaneously. In the large format (102 cm sheet width) in sheet-fed machines, 32 color zones extend over the entire printing material width; the result in the case of 6 printed colors is thus 192 measuring areas which have to be registered by the measuring electronics and the measuring heads. In this case, measuring cycles over at least 192 sheets are required at a single spectral measuring head, which is not sufficient for good regulation. For this reason, a plurality of measuring heads which are capable of measuring in parallel and simultaneously are needed. Since, after each measuring operation, the measuring heads are offset laterally by one color zone, in particular 8, 16 or 32 measuring heads are ideally suitable for the parallel measurement. In the case of 32 measuring heads and 32 color zones and also 6 printed colors, it is accordingly necessary for 6 measuring operations to be carried out on 6 printed sheets. After these 6 measuring steps, the adjustment to the settings of the printing press can then be made if necessary, in that corrected values are set with new inking zone setting on the printing press. In addition to the aforementioned measuring strategy, the measuring heads can also be moved in a way wherein the same color is always registered first over a plurality of sheets, so that this color can be readjusted well and only then are the measuring heads positioned to the next color, which is then likewise readjusted. Since different measuring strategies can be employed, the measuring device must store the measured values with a timestamp and a location marking in the computer of the printing press, so that the correct references can be produced at any time in order to be able to compare the actually comparable measured values correctly with one another. Then, the measuring strategy no longer plays any role and the measured values can be assigned correctly at any time.

In a refinement of the invention, provision is additionally made that, during printing operation, after the printing start-up phase, the measuring heads are positioned in such a way that they register a plurality of colors simultaneously. Since the mechanics and the drive motor of the measuring beam having the measuring heads are highly stressed by frequent measurement, what is known as lean operation increases the lifetime. However, since the values still change to a great extent during the start-up phase as a result of the process, frequent measurements have to be made continuously there while, in the continuous printing phase, another procedure can be selected since, during the continuous printing phase, the color values remain virtually constant as seen over time, so that it is possible to position the measuring heads over mixed areas. As soon as an excessively high tolerance deviation is detected, the measuring beam then begins its frequent measurements again as in the start-up phase, which measurements register all the areas and all the zones. As a result, the reason for the deviation can be measured and the regulation of the printing press can be activated appropriately.

The measuring device is also able to change its measuring strategy as a function of the measured values registered. For example, colored areas which exhibit low noise are not measured as often as colored areas with high noise. This means that each color is registered with a different measuring strategy, so that highly noisy colors are measured more frequently. If the noise in the case of these colors decays, the measuring strategy is also changed, so that the frequent measurements are reduced. The measuring strategy can also be carried out as a function of the printed image and the settings of the printing press itself. Since the data from the printed image from the prepress stage can be transmitted to the computer, the measuring system is also able to calculate an appropriate measuring strategy, since critical color areas in the printed image are previously known with their position and the hue.

In a further refinement of the invention, provision is made for the computer to store the position coordinates of print control strips applied to a printing material. The measurements on the color zones in printing presses are normally carried out in the region of the print control strips. In order that these measurements can be carried out reliably, the position of the print control strip on the printing material must be known to the measuring beam of the in-line measuring system. One possibility is for the printer to measure the position of the print control strip on the printing plates manually and to enter the position coordinates of the print control strip into the computer of the machine control system. Furthermore, the position coordinates from the prepress stage in a linked workflow system can also be transmitted to the computer of the printing press and used there. In both possibilities, however, there is the risk that, when the printing plates are clamped in the printing press or as a result of a register adjustment, the position of the print control strip on the printed sheet relative to the measuring heads is changed. However, by using the predefined rough position, the search area for an exact position determination can be restricted, which means that the work is made easier for the automatic position detection system.

Provision is also made for a sensor to be provided for determining the position of the print control strip on the printing material. By means of a two-dimensional sensor, for example a CCD image converter, the position of the print control strip can be determined. A pattern of the print control strip is installed in the machine control system and is compared with the image from the images registered by the CCD camera. As soon as the camera detects equivalence, the computer is able to calculate the position of the print control strip relative to the measuring beam and to send an appropriate starting signal to the latter in order that the measurement starts exactly when the print control strip comes to lie underneath the measuring heads. The use of a one-dimensional sensor is also suitable for the position detection of a print control strip if a detection segment, for example a bar code, precedes the print control strip. As soon as this bar code is detected by a barcode reader, it is known to the system that the print control strip then follows at a specific time interval. Therefore, the measuring operation can be triggered at the correct time. The position detection is necessary only at the start of the printing operation, since here still greater local deviations are to be expected. In the continuous printing phase, the local position of the markings is stable, so that here the detection segments have to be scanned only at long time intervals for the purpose of monitoring.

A particularly advantageous refinement of the invention is distinguished by the fact that, after each measurement, the measured values determined by the measuring heads are subjected to a plausibility test. In the case of in-line measurement with a closed control loop, it is particularly important to detect and separate out erroneous measured values automatically, since otherwise the inking zone control system sets the wrong values and rejects are produced unnecessarily, without the operating personnel being informed about this. For this reason, an in-line measuring system with closed control loop should subject the measured values to a plausibility test in order to be able to separate out implausible measured values. Such a check is carried out, for example, by means of the correlation between the stored original of the print control strip and the values from the measuring beam registered during each measuring operation. This also ensures that the measuring beam always moves to the correct measuring areas. The choice of the correct print control strip type may be checked by means of a further algorithm, wherein a sensor registers a coding area within the print control strip and checks the data encoded herein. Furthermore, during each measuring operation, a plausibility check on the measured values is carried out both in the space domain and in the time domain. To this end, limiting values for deviation, for example in the density range, are defined, which two successive or locally adjacent values lying together must not exceed. Here, the plausibility test is based on the fact that, in the offset process, the printing units in normal operation only permit continuous changes in the color values, so that jumps in the color density which exceed a specific order of magnitude can be attributed immediately to defects in the measuring system. In addition, a display can be provided which provides information about the state of the printing process. If the measuring system registers no deviations or only small tolerable deviations and controls them out by means of the machine control system, the OK state is displayed to the printing personnel on a display. If the machine is not in this stable state, this can be detected on the display and the printing personnel know that rejects are being produced.

The measuring method can also be used for the indirect moisture measurement of the sheet. In order to measure the moisture, the damping solution is usually reduced until, in the halftone print on the sheet, what is known as "scumming" occurs. According to experience, this scumming is first manifested at the start of the sheet, at the lateral edge of the sheet and in the halftone areas having 70%-90% area coverage. The moisture value is then increased again by a specific fixed percentage value. For the in-line measurement, a 70%-90% halftone area is introduced on the sheet in the print control strips or at positions for each color specifically arranged on the sheet at the sheet edge. From the knowledge of the area coverage of this area and the printed color density, slight scumming can thus be registered reliably by the measuring heads. Therefore, the ink-water balance can be set and monitored.

Other features which are considered as characteristic for the invention are set forth in the appended claims.

Although the invention is illustrated and described herein as embodied in inline measurement and regulation in printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
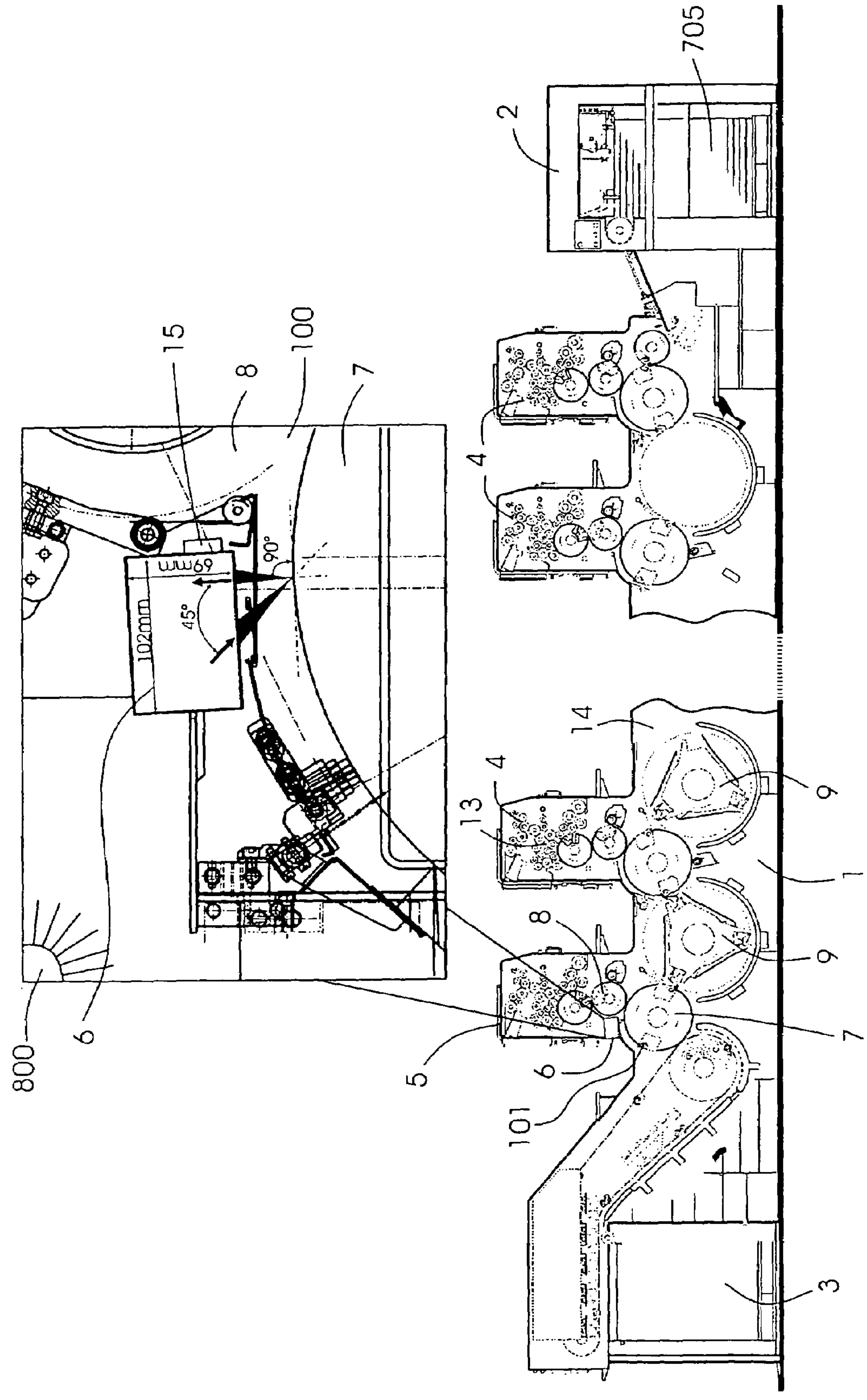
FIG. 1 is a side elevation of a sheet-fed printing press with a measuring beam in the printing unit of the sheet-fed press.

Referring now to the figures of the drawing in detail and first, particularly, to FIG. 1 thereof, there is shown a sheet-fed rotary printing press 1 having a sheet feeder module 2 and a sheet delivery module 3 and also four printing units 4, 5 arranged between them. It will be readily understood by those of skill in the art that this configuration of a sheet-fed rotary printing press 1 is but an exemplary embodiment, since the number of printing units 4, 5 between sheet feeder 2 and sheet delivery 3 is of no import with regard to the invention. The printing units 4, 5 are connected to one another via transport cylinders 9, so that printed sheets 705 stacked in the sheet delivery 2 are conveyed through the individual printing units 4, 5 to the delivery 3 and can be printed in the printing units 4, 5. The last printing unit 5 seen in the sheet running direction differs from the other printing units 4 in that it has a measuring beam 6 as a sensing device for assessing the printing quality of printed sheets. The measuring beam 6 is therefore accommodated in the last printing unit 5, since here all the colors applied in the printing operation are present on the printed sheets 705, and therefore the final state of the printed sheet is present. In this connection, the term printing unit 4, 5 is to be understood more widely, since of course one or more of the printing units 4, 5 can also be varnishing units, sealing units or other sheet-processing units. Even if these other units are present in the printing press 1, it is expedient for the measuring beam to be fitted in the last unit 5, in order to be able to monitor the sheet 705 with all the varnish layers. All the printing units 4, 5 have an impression cylinder 7 and a blanket cylinder 8, which form the press nip 100 of a printing unit 4, 5. Furthermore, each printing unit 4, 5 is equipped with an inking unit 13. The cylinders 7, 8 and the inking unit 13 are mounted in the side walls 14 of the printing press 1 and are driven by motors and gearboxes present there.

The press nip 100 between the printing cylinders 7, 8 can be seen more clearly in the enlargement in FIG. 1. The enlargement of the surroundings of the press nip 100 in the last printing unit 5 together with the measuring beam 6 additionally shows the approximate size relationships of the cross section of the measuring beam 6 as compared with the diameter of the press cylinders 7, 8. Also fitted to the impression cylinder 7 are sheet grippers 101, which guide the sheet 705 around the impression cylinder 7, accept it from the transport cylinder 9 and transfer it to the delivery 3. During the measuring operation by means of the measuring beam 6, the printed sheet 705 is held firstly at its rear end by the press nip 100 and secondly at its leading end by the sheet gripper 101. This ensures that the sheet 705 can move only minimally during the measuring operation, which is of importance to the measuring operation in as much as the distance between sheet 705 and measuring beam 6 should if possible not vary during the measurement. The dimensions of the cross section of the measuring beam 6 in FIG. 1 in the case of a printing press 1 of 102 cm sheet format are 102 mm in width and 69 mm in height at its end face. Furthermore, the measuring beam 6 is inclined slightly with respect to the horizontal, so that it runs parallel to the surface of a sheet 705 when the latter is being guided by the sheet gripper 101 and the press nip 100. Fixed to the measuring beam 6 is a sensor 15, but this can also be integrated into the measuring beam 6. This sensor 15 is an optical sensor, for example a camera, which is able to detect markings on the printed sheet 705. In addition, the sensor 15 can be used for the purpose of observing external light sources 800 and triggering the measuring operation by the measuring beam 6. To this end, the sensor 15 is linked to the measuring electronics 201 and the computer 200 of the printing press 1. Thus, the measuring operation can be controlled by the sensor 15 in such a way that measurements are made only when no external light 800 is falling on the measuring area or directly into the sensing device 6. The sensor 15 can comprise a combined sensor or a plurality of separate sensors. It is also possible for a plurality of sensors 15 distributed over the entire length of the measuring beam 6 to be fitted. The sensors 15 can also be integrated into the measuring beam 6.

Figure 2:
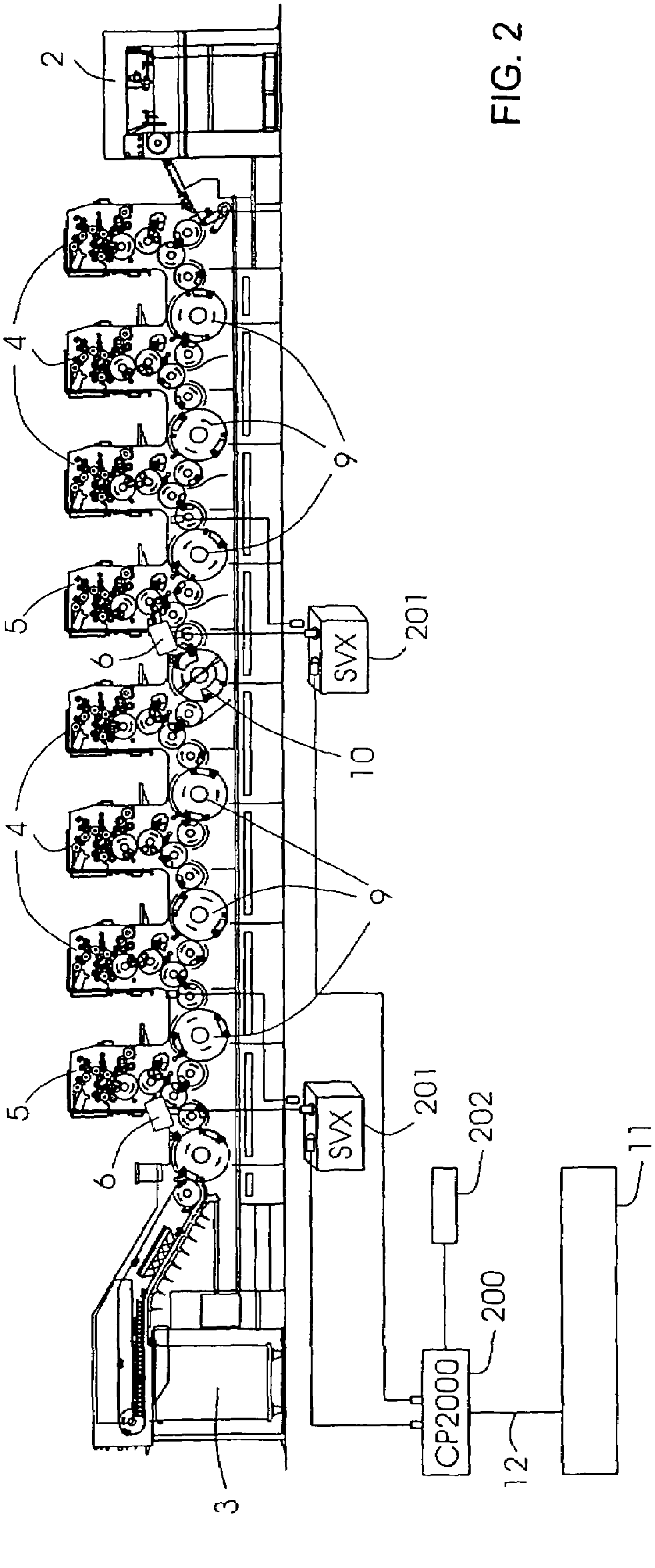
FIG. 2 is a partly schematic side view of a sheet-fed printing press for perfecter printing.

FIG. 2 shows a sheet-fed rotary printing press 1 which, as distinct from FIG. 1, is equipped with a sheet turning device 10, so that, in the event of perfecting in the first four printing units 4, 5, one side of a sheet 705 can be printed and the other side can be printed in the second four printing units 4, 5. For this reason, the printing press 1 in FIG. 2 has two printing units 5 to which measuring beams 6 are fitted, since both the front and the rear of a sheet must in each case be monitored by a measuring beam 6. In order to be able to assess the final state of a printed sheet 705 both in relation to the front and to the rear here as well, the measuring beams 6 are located in the last printing unit 5 before the turning device 10 and in the last printing unit 5 before the sheet delivery 3. As a special feature, the sheet-fed printing press 1 in FIG. 2 has the possibility of displacing the measuring beam 6. This means that the measuring beam 6 is configured such that it can be removed easily and can also be installed in another printing unit 4. For this purpose, connections are also fitted to the printing units 4 preceding the two printing units 5 in FIG. 2. The printing units 5, 4 designed to accommodate a measuring beam 6 are provided with electrical connections for this purpose, which are in each case connected to measuring electronics 201. When the measuring beam 6 is plugged into the respective printing unit 5, 4, the measuring electronics 201 is automatically notified via appropriate encoding as to the printing unit 5, 4 wherein the measuring beam 6 is currently located. The measuring electronics 201 are in turn connected to the control desk and computer 200 of the printing press 1, so that all the measured values can be displayed there to the operating personnel of the printing press 1. In addition, the settings of the printing press 1 can be changed on the operating desk 200 in order to control the printing quality. The computer 200 of the printing press 1 is additionally connected to prepress devices 11 via a cable-bound or wire-free connection 12, for example also via an Internet connection; such devices 11 are in particular plate exposers for producing printing plates for offset printing presses. As a result of the connection 12 to the prepress stage 11, it is possible to use the data originating from the measurements of the measuring beam 6 for changing the production process in the prepress stage 11 as well. Therefore, further-reaching changes in the printing process can be made than would be possible by means of simple changes to the settings of the printing press 1. In addition, the production of the printing plates can be optimized. It is also possible for a hand-held measuring instrument 202, which can be used for calibration purposes of the measuring modules 603, to be connected to the computer 200 of the printing press 1.

Figure 3:
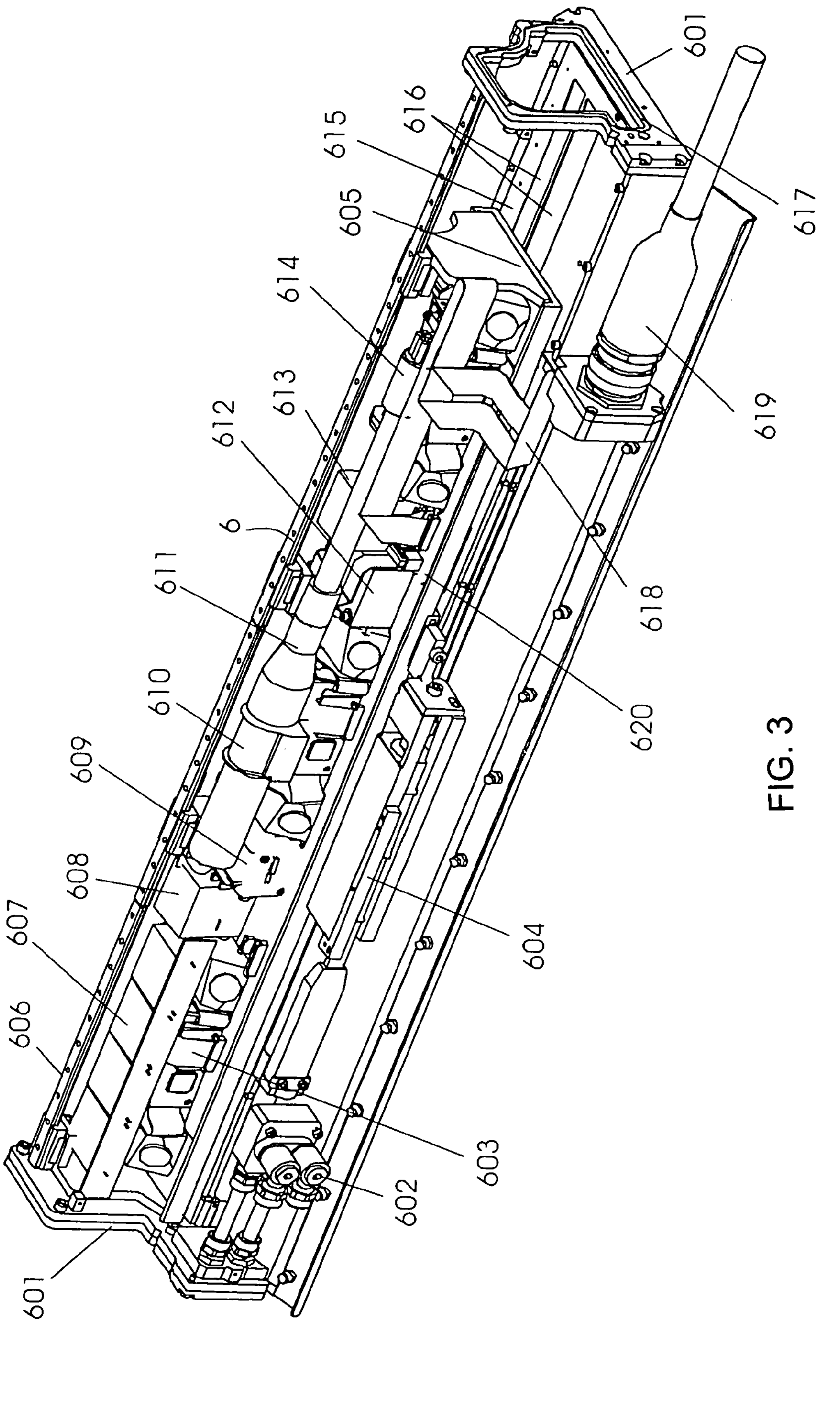
FIG. 3 shows a broken-away, internal view of the measuring beam.

The interior of the measuring beam 6 is depicted in FIG. 3, the measuring beam 6 being constructed in such a way that it can be fixed in the printing unit 5, 4, while a movable measuring carriage 605 is arranged in the interior of the measuring beam 6. The measuring beam 6 extends over the entire width of a printed sheet, in order to be able to monitor the edge regions of the printed sheet reliably. The measuring carriage 605 can be moved in the interior of the measuring beam 6 for this purpose, in order likewise to be able to measure over the entire width of the sheet. In order to register the surface of the printed sheet, the measuring carriage 605 in FIG. 3 has eight measuring modules 603 having 8 measuring heads 622, it being possible for the measuring carriage 605 to be moved in a plurality of steps or continuously, so that, in the case of 4 colors, after 16 measurements all 32 inking zones of a plurality of printed sheets 705 have been measured. For this movement operation, the measuring carriage 605 is mounted in a guide rail 606, being driven by a linear motor 604. For the purpose of simple maintenance of the measuring carriage 605, the latter can be removed laterally from the measuring beam 6 by the side walls 601 being removed. For this purpose, the side walls 601 are configured so as to be easily removable, that is to say they are fixed to the housing of the measuring beam 6 by a plurality of screws.

The measuring beam 6 substantially comprises a U profile which is open on the side facing the printed sheet. In order to prevent the penetration of dirt and, in particular, printing ink, the open side of the U profile is closed by a removable base 615, which additionally has transparent parts 616 made of glass, so that the measuring modules 603 on the measuring carriage 605 are able to sense the printing material located underneath through the base 616 of the measuring carriage 615. Besides the measuring modules 603 together with their electronics, there is further equipment on the measuring carriage 605. Since the measuring modules 603 also have illumination modules 623 in addition to the spectral measuring heads 622, the measuring carriage 605 must be provided with a source of illumination 610. The source of illumination constitutes a flash lamp 610, which is supplied with electrical power by a mains power unit 612 located on the measuring carriage. The mains power unit 612 in turn and electronics of the measuring modules 603 are connected to the housing of the measuring beam 6 via flexible electric cables 618. The end of the flexible electric cable 618 fixed to the housing of the measuring beam 6 ends in an electric plug connector 619, by means of which the measuring beam 6 is connected to the electrical power supply of the printing press 1 and the measuring electronics 201. In this case, the connection of electrical power and signal transmission can be carried out by means of a plug-in or rotatable combination plug. All the electrical components, including the measuring modules 603, are fitted on one or a few circuit boards 631, in order to ensure short current and signal paths in a small space.

Since there is only one flash lamp 610 on the measuring carriage 605, its flash light must be transported to the individual illuminating modules 623 by means of injection optics 611 and following optical waveguides 614. In addition to the mains power unit 612 of the flash lamp 610, there are also flash capacitors 607 on the measuring carriage 605 in order to provide the necessary energy. In addition, the measuring carriage 605 contains a distributor device 620 for distributing electric energy to the individual electrical loads and for distributing the electric signals of the components networked with one another in the measuring carriage 605. However, the sensing device 6 is not only capable of measuring the surface of a printed sheet spectrally, but it is also used for registering register marks and for evaluating the same. To this end, the measuring carriage 605 has a right-hand register sensor 608 and a left-hand register sensor 613. It is therefore possible to register the register marks in the edge regions of a printed sheet. There can also be further register sensors, for example each measuring module 603 can include a register sensor, in order that a plurality of register marks over the entire width of the printing material 705 can be measured.

Since all of the electronics in the measuring carriage 605 are accommodated into a very small space, for example 70 percent of the volume of the measuring carriage 605 is filled with components, a great deal of waste heat is produced in a relatively small space. In order to be able to carry away the waste heat and in particular to prevent damage to and influence on the measuring modules 603, the interior of the measuring beam 6 is liquid-cooled. A closed cooling circuit is produced by a plurality of ducts 621 in the interior of the measuring beam 6 and the side walls 601, this cooling circuit being closed via coolant ducts 617 in the side walls 601. The coolant ducts 621, 617 are supplied with coolant via a coolant connection 602 on the outside of the measuring beam 6. A pump for circulating the coolant therefore does not have to be fitted in the interior of the measuring beam 6 itself, but can be connected externally.

Figure 4:
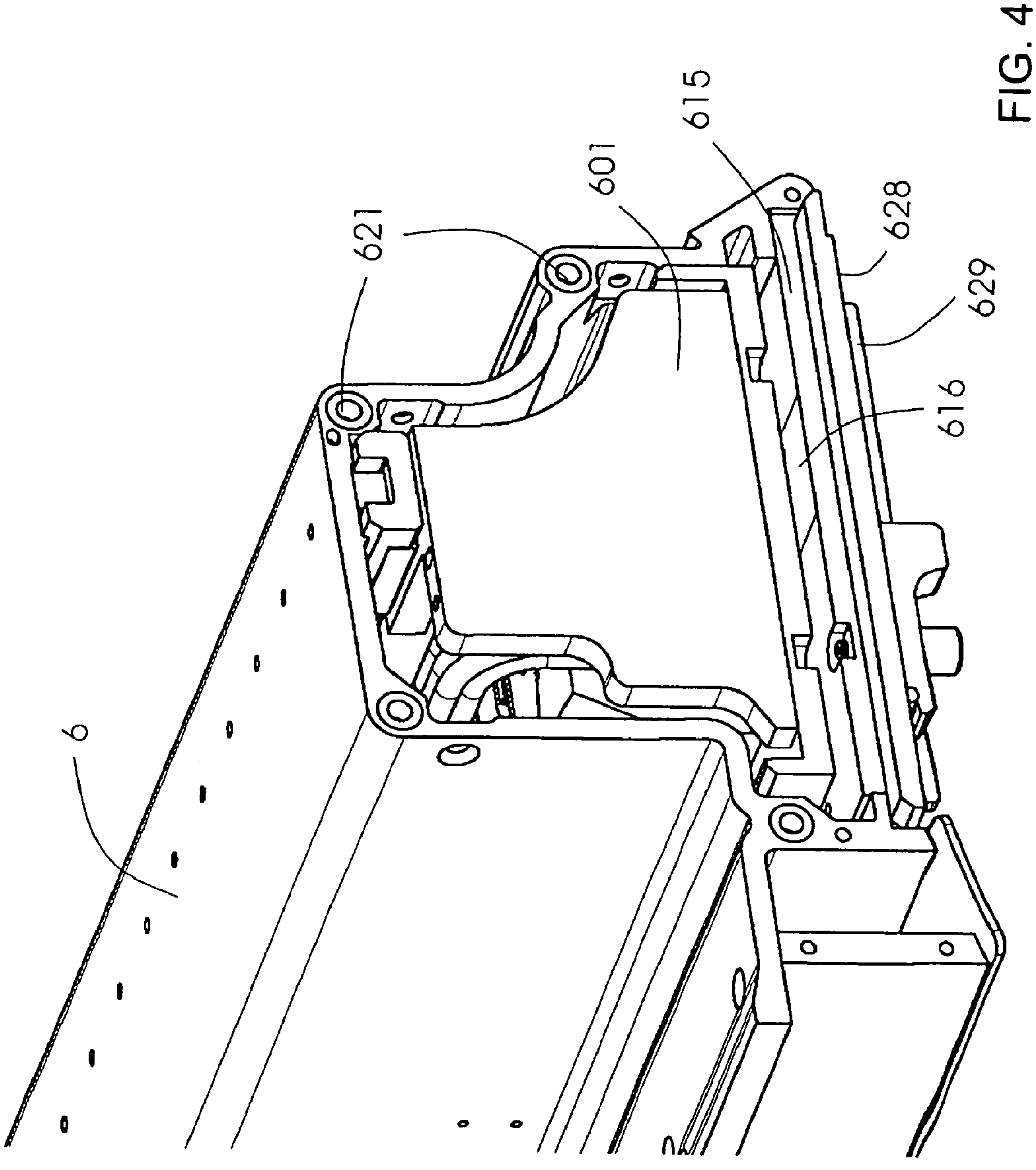
FIG. 4 is a cross section taken through the measuring beam illustrated in FIG. 3.

The side view of the measuring beam 6, shown in FIG. 4, shows, in addition to the substantially U-shaped profile of the measuring beam 6, the coolant ducts 621 running in the U profile, which are connected to the closed circuit at the two end faces of the measuring beam 6 by the coolant ducts 617 in the side walls 601. Furthermore, the glass cover 615 in the base of the measuring beam can be seen, which protects the sensitive measuring modules 603 on the measuring carriage 605 against contamination. The U-shaped housing of the measuring beam 6, the side walls 601 and the measuring beam base 615 with its glass inserts 616 are connected to one another via seals, so that no dust or liquids can get into the interior of the measuring beam 6. Furthermore, on the outside of the base 615 there is a dirt-repellant surface 628, over which there extend webs 629 located transversely with respect to the longitudinal extent of the measuring beam. The webs 629 hold the printing material 705 at a distance when it is being measured and, in this way, avoid direct contact between printing material 705 and base 615. The webs 629 can also be coated in a dirt-repellant manner.

Figure 5:
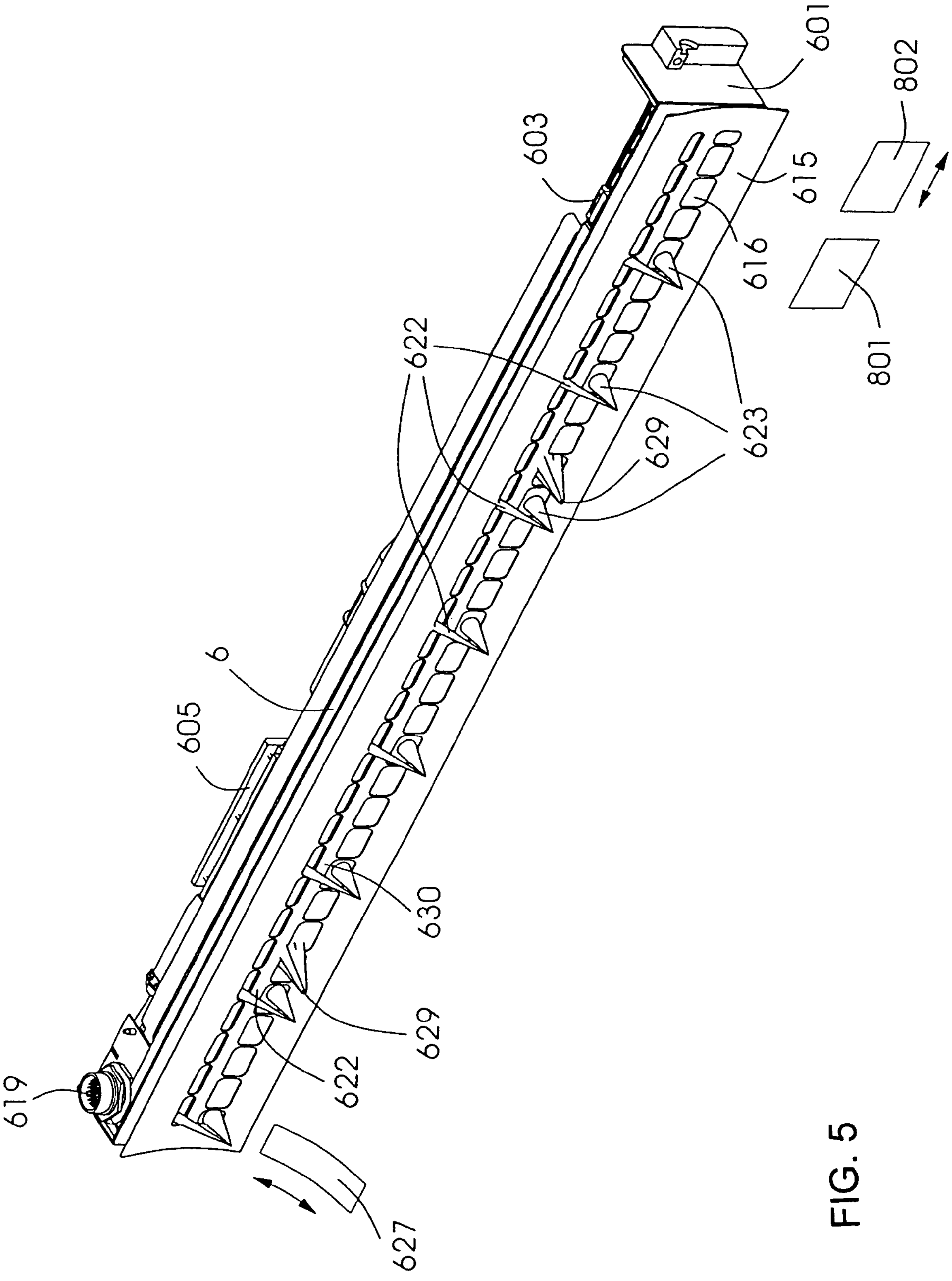
FIG. 5 is a perspective view of the measuring beam of FIG. 3 from below.

FIG. 5 shows a view of the measuring beam 6 from below, it being possible to see the measuring beam base 615 well here. The measuring carriage 605 has eight measuring modules 603, which each comprise the actual measuring heads 623 and illuminating modules 623. In order to be able to measure the entire width of a printed sheet having 32 inking zones, after each measuring operation the measuring carriage 605 is moved laterally by one or more measuring areas. The distance between the measuring modules 603 is thus four inking zones, so that the measuring modules 603 measure exactly each fourth inking zone in parallel. Following four sensing operations, the sheet has then been measured over all 32 inking zones of a color. If printing is carried out with four colors, 16 sensing operations are accordingly necessary. Furthermore, a movable shutter 627, which is able to cover a measuring module 603, can be seen in FIG. 5. The shutter 627 can be present on every module 603 and is driven electrically or mechanically, but a common shutter 627 for all the modules 603 can also be used. In FIG. 5, the shutter 627 can be moved in the sheet transport direction, transversely with respect to the measuring beam 6, and protects the optics of the measuring modules 603 against damage between the measuring operations; it can also cover all of the underside of the measuring beam 6 between the individual measuring operations. For this purpose, the drive of the shutter 627 is coupled to the computer 200 of the printing press.

Arranged at one end 601 or else at both ends in FIG. 5 is a calibration surface 801, to which the outer measuring modules 603 can be moved. If a measuring module 603 is positioned above the calibration surface 801, then this standardized surface is measured. The surface is a white tile which corresponds to paper white. By means of measuring the tile 801, a measuring module 603 can be calibrated at any time between two measurements on the printing material 705. The measuring modules 603 which cannot move to the tile 801 are calibrated by means of transfer calibration from the adjacent measuring modules 603. In order to protect the tile 801 against contamination, it can likewise be closed by means of a cover 802 that can be moved laterally. Thus, the tile 801 is always kept covered by the cover 802 between the calibration measurements.

Webs 629 which are dirt-repellent and hold the sheet at a distance can also be seen in FIG. 5. These webs 629 are connected to the cover 615 of the measuring beam 6. The measuring beam is sealed off by a glass layer 616 located under the cover 615. For the purpose of cleaning the glass layer 616, the cover 616 having the webs 629 and the cut-outs for the clear view of the measuring modules 603 can be folded away onto the sheet 705 or removed, so that all of the area of the glass layer 616 can easily be cleaned.

Figure 6:
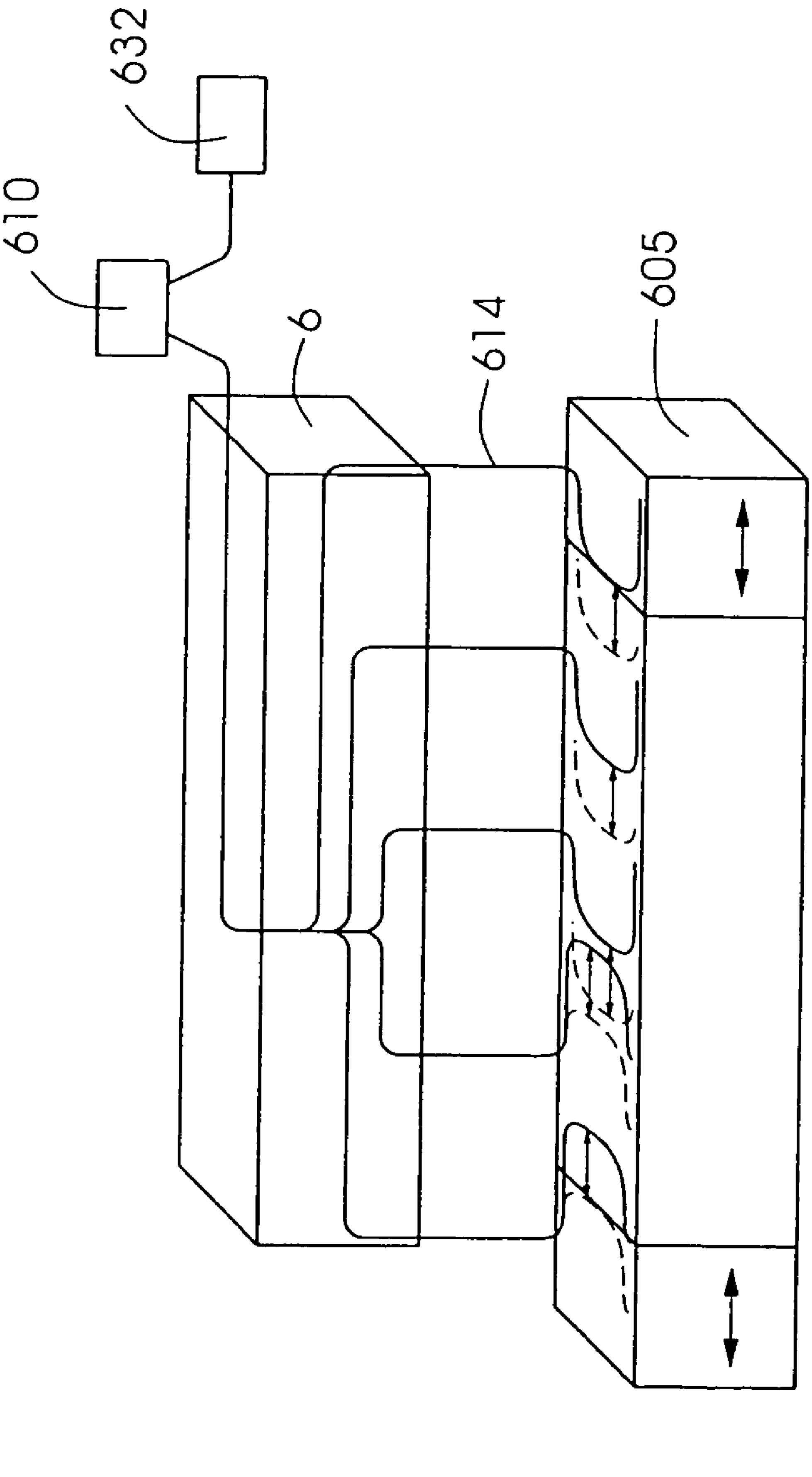
FIG. 6 is a diagram of an optical waveguide assembly in the measuring beam.

In addition to the possibility, illustrated in FIG. 3, having light sources 610 arranged on the measuring carriage 605, it is also possible, according to the arrangement in FIG. 6, to fit the flash lamp 610 outside the measuring carriage 605 and even outside the measuring beam 6. In this case it is necessary to use flexible optical waveguides 614, which connect the non-moving parts of the measuring beam 6 and the measuring carriage 605. However, the flexible waveguides 614 can also be used when the lamp 610 is located on the carriage 605, as in FIG. 3. In this case, the optical waveguides 614 can be led separately to each measuring module 603, as in FIG. 6, but it is also possible to bundle the optical waveguides 614 at one point and to lead them to the respective measuring module 603 via longer paths in the interior of the measuring carriage 605. If all the measuring modules 603 receive the light from a single light source 610, it is ensured that all the measuring modules 603 use the same light during the measurement and therefore the measuring conditions for all the modules 603 are the same. It is also possible for an additional optical waveguide 614 to be connected to the lamp 610 and to open on the other side in a light reference measuring head 632. This light reference measuring head 632 has the task of measuring the light from the lamp 610 and, in the event of a change, of outputting a signal relating to maintenance and inspection. Thus, a defective lamp 610 or one no longer equipped with sufficient illuminating power as a result of aging can be detected in good time.

Figure 7A:
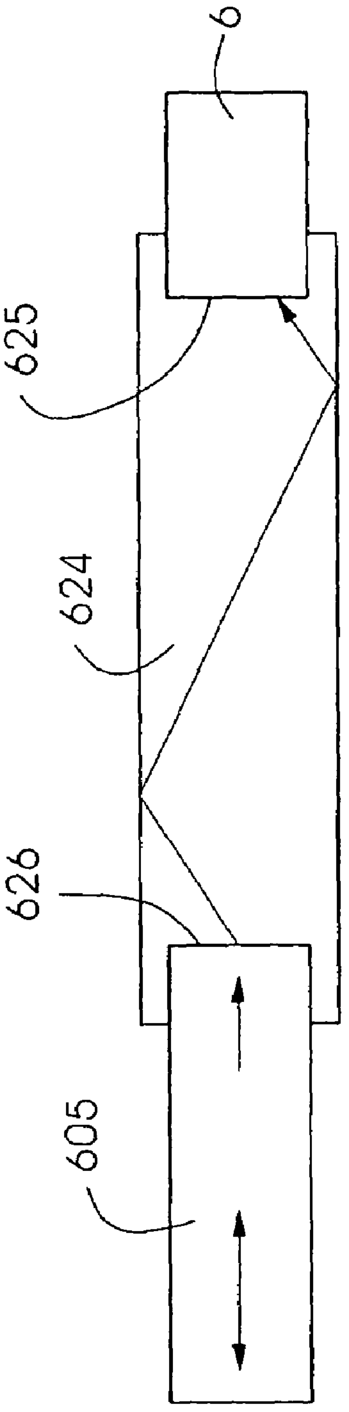
FIG. 7A shows an optical waveguide assembly in the measuring beam with optical interspace.
Figure 7B:
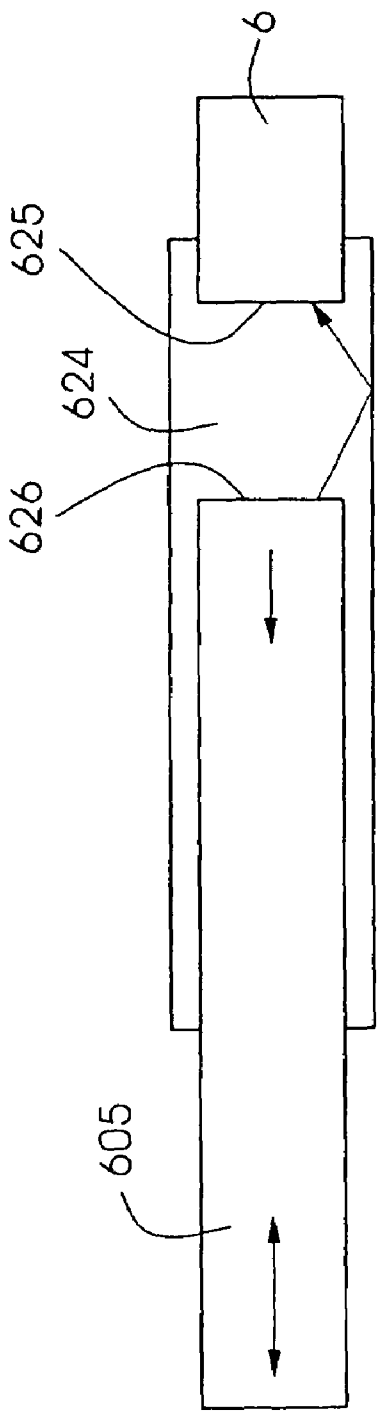
FIG. 7B shows the optical waveguide assembly from FIG. 7A with reduced optical interspace.

As an alternative to flexible optical waveguides 614 as in FIG. 6, as shown in FIGS. 7A and 7B the principle of the optical trombone can also be used. In this case, the optical waveguides of the measuring carriage 605 and of the measuring beam 6 in each case end at the end faces 625, 626 of the same, so that they are always located and aligned accurately with respect to one another. Between the end faces 626 of the optical waveguides of the measuring carriage 605 and the end faces 625 of the measuring beam 6 there is an optical interspace 624 which, as shown in FIGS. 7A and 7B, has a different size depending on the position of the measuring carriage 605. The optical interspace 624 between the optical waveguides can be bridged by it being silvered. By means of this silvering, the light beams emerging from the optical waveguides of the measuring beam 6 can be coupled into the optical waveguides in any position of the measuring carriage 605. Such an optical trombone is less susceptible to wear than flexible optical waveguides 614, which is of enormous importance in view of million-fold measuring operations. This is because it has transpired that flexible optical waveguides 614 tend to break after relatively few measuring operations and then have to be replaced.

Figure 8A:
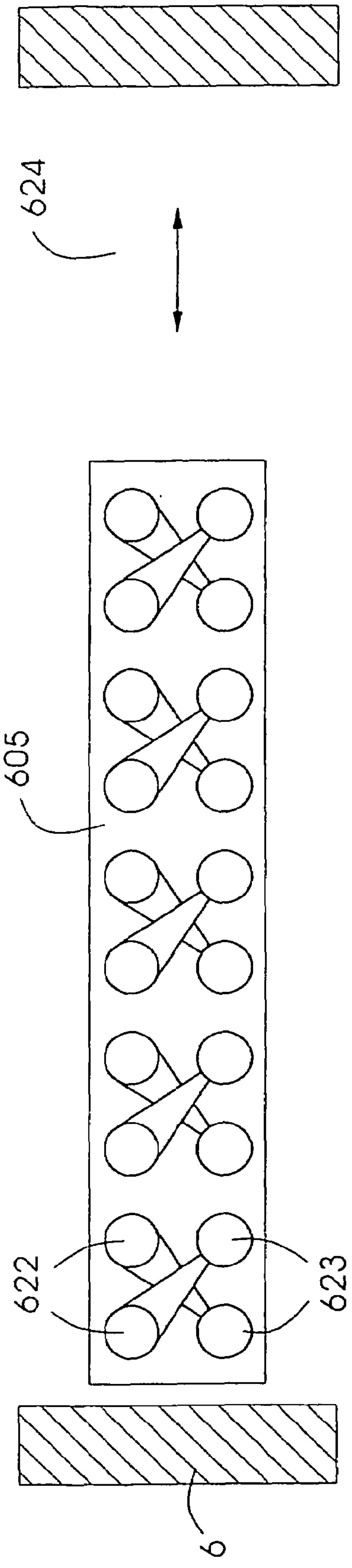
FIG. 8A shows a crossover arrangement of measuring heads and illuminating devices.
Figure 8B:
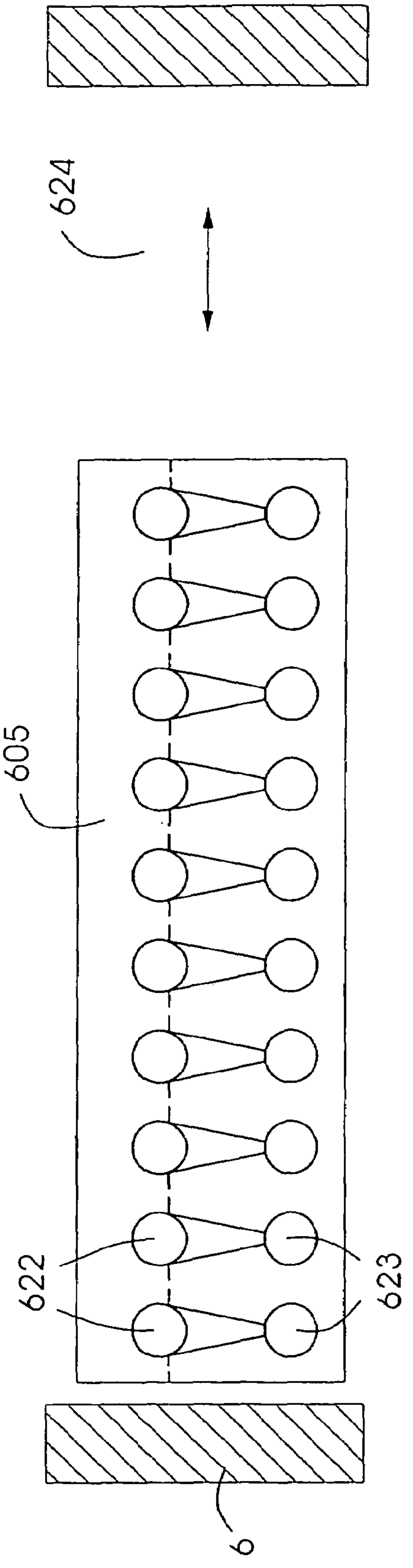
FIG. 8B shows a conventional arrangement of measuring heads and illuminating devices in the measuring beam.

FIGS. 8A and 8B each show the measuring beam 6 seen from below, with two different arrangements of measuring heads 622 and illuminating modules 623. In the arrangement according to FIG. 8A the measuring heads 622 and the illuminating modules 623 are aligned so as to cross over one another, so that the light which is reflected from the printing material is not sensed by the measuring head 622 located directly opposite, but is crossed over like a cross. Such an arrangement permits the disposition of many measuring heads in a small space, since here the distance between the measuring heads 622 and the opposite illuminating modules 623 can be smaller as compared with an arrangement according to FIG. 8B, wherein the measuring heads 622 sense the reflected light from exactly opposite illuminating modules 623. The smaller space in FIG. 8A results from the diagonal crossing, since the distance between the illuminating modules 623 and the associated measuring heads 622 cannot be reduced arbitrarily. The distance is defined by the beam path from the illuminating modules 623 to the printing material and back to the measuring head 622. With the crossover solution, the width of the measuring beam 6 and the measuring carriage 605 respectively can be reduced. Since, given the restricted space in the vicinity of the press nip 100 of a printing unit 4, 5, the space required is a decisive criterion, the arrangement according to FIG. 8A is better suited to this case.

Figure 9:
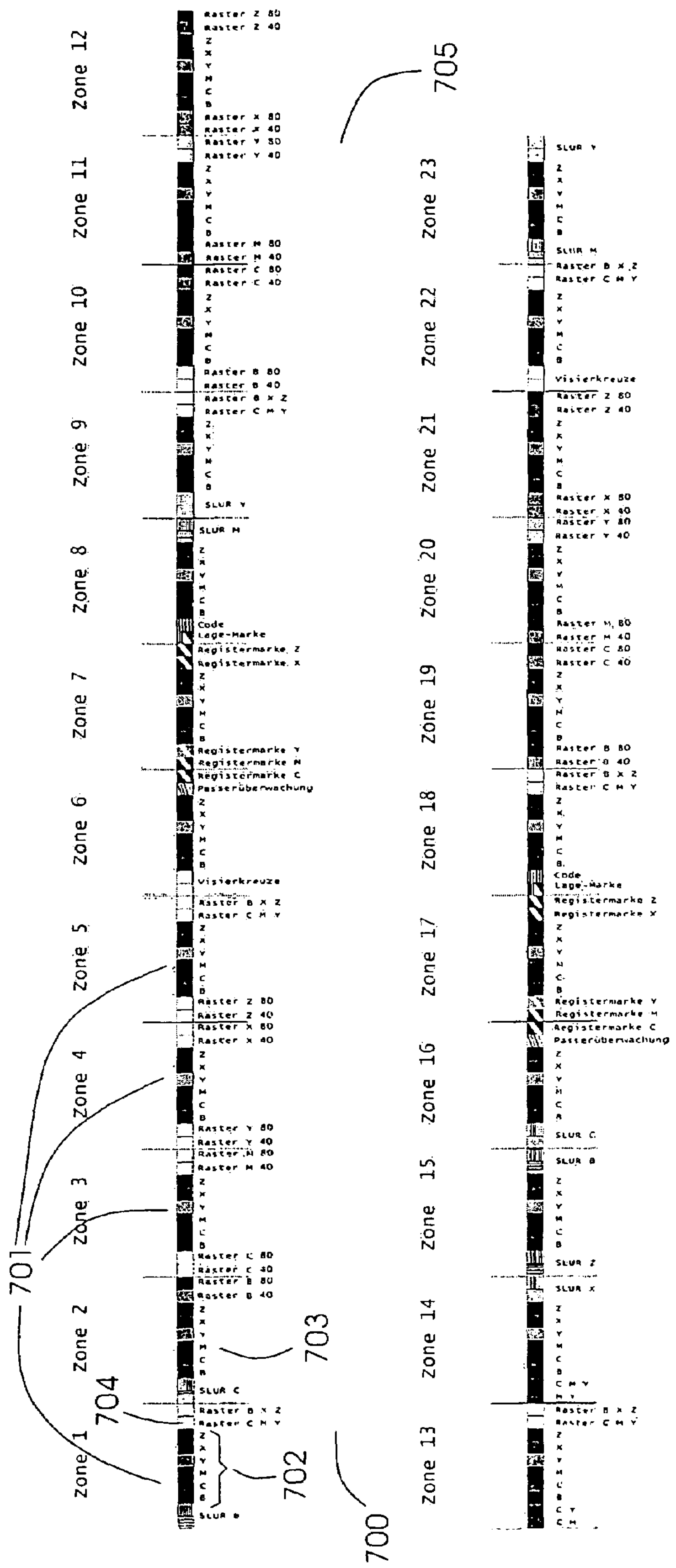
FIG. 9 shows a print control strip on a printing material.

In FIG. 9, a print control strip 700 on a printed sheet 705 is illustrated. The print control strip 700 and the actual printed image are printed onto the sheet 705 in the printing units 4, 5 of the printing press 1. After the last printing unit 5, the sheet 705 and the print control strip 700 are complete and can be measured by the measuring beam 6. The sheet 705 here is present in what is known as the medium format, that is to say with a sheet width of 74 cm, and has 23 inking zones 701, 703. Each inking zone 701, 703 comprises 6 color measuring areas 702 and four further measuring areas 704. These inking zones 701, 703 are measured by the measuring modules 603 of the measuring beam 6. Normally, only one of the measuring areas 702, 704 per color separation and inking zone 701, 703 on a sheet 705 is measured by a measuring module 603. In the case of 23 inking zones 701, 703, six measuring modules 603 and 10 measuring areas 702, 704 per inking zone, this results in 40 measuring operations on 40 printed sheets 705 before all the measuring areas 701, 703 have been registered once. For more measurements on fewer sheets, more measuring modules 603 have to be provided. Furthermore, a plurality of print control strips 700 can also be applied to a sheet, for example one at the sheet start and one at the center of the sheet or the end of the sheet. Alternatively, during continuous printing operation, that is to say when the printing press 1 is running at production speed and all the measuring areas 702, 704 have reached their desired state, the measuring modules 603 can also be placed over specific measuring areas 702, 704 which contain color information about a plurality or all of the colors. The measuring modules 603 then even do not have to be moved at all or much more rarely, since the color information is present in locally compact form in one measuring area. In the event of changes within the specific measuring areas, then the measuring mode is changed again, and all the measuring areas 702, 704 are measured again as in the start-up phase.

Figure 10:
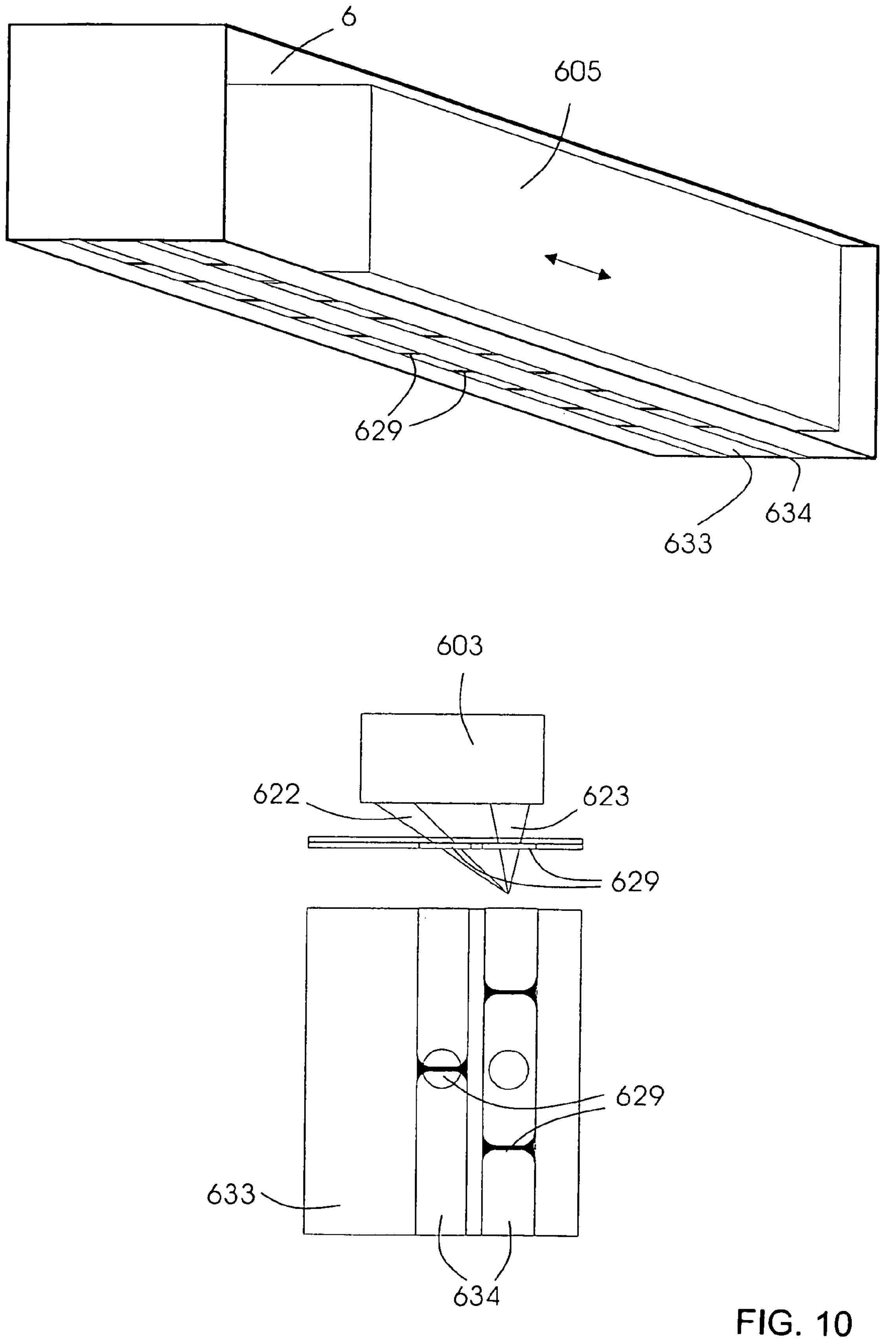
FIG. 10 shows a measuring beam having a glass base and a cover formed as slotted sheet guide.

FIG. 10 shows a similar embodiment to that of FIG. 5; in both embodiments a measuring carriage 605 that can be moved laterally is located in an encapsulated, sealed measuring beam 6. However, in FIG. 10 the measuring beam has a continuous glass cover 634 which closes the underside of the measuring beam 6. On the outside of the measuring beam 6, over the continuous glass cover 634, there is also a sheet guide plate for sheet guidance 633, which bears two slots 639 in the longitudinal direction. Through these slots 639 and the glass cover 634, the measuring modules 603 comprising measuring head 622 and illuminating module 623 in the measuring carriage 605 are able to measure a printing material 705 running through under the sheet guide 633. In addition, there are webs 629 arranged on the outside of the glass cover 634 and within the slots 639. The webs 629 prevent the printing material 705 touching the glass cover 634 and therefore soiling the latter. Since the webs 629 formed as in FIG. 10 can under certain circumstances be in the beam path of the measuring module 603, because the measuring carriage 605 must measure over the entire width of the printing material, a compensation device is provided which compensates for the influence of the webs 629 in the beam path of the measuring modules 603. Such a compensation device has already been described at another point in this application.

Figure 11:
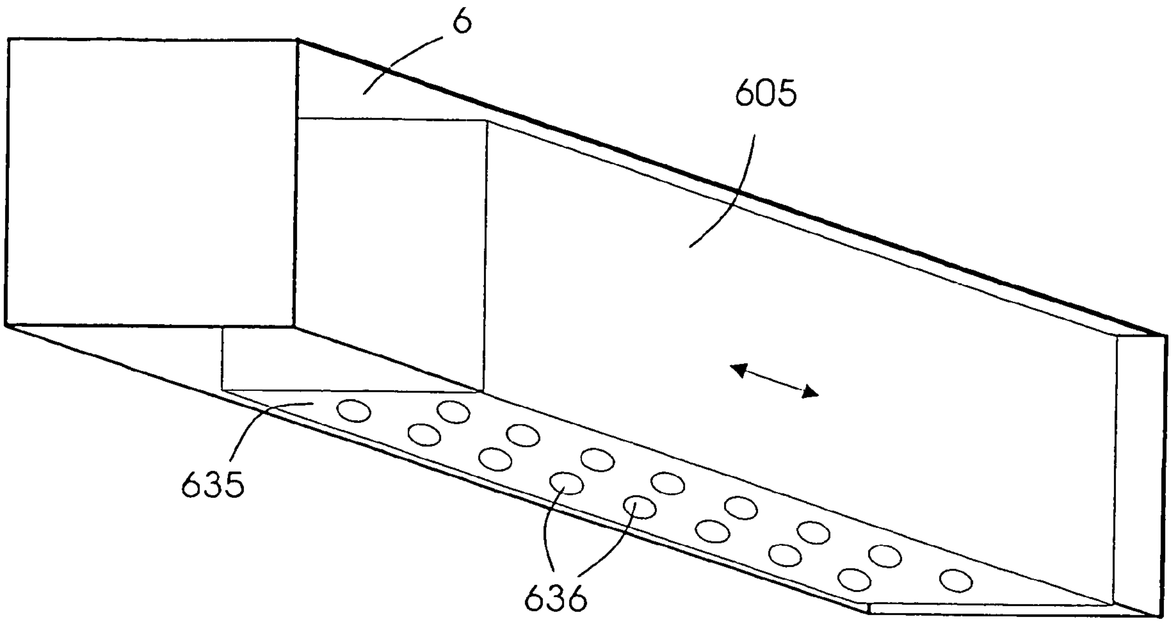
FIG. 11 shows an open measuring beam having a sealed measuring carriage.
Figure 11:
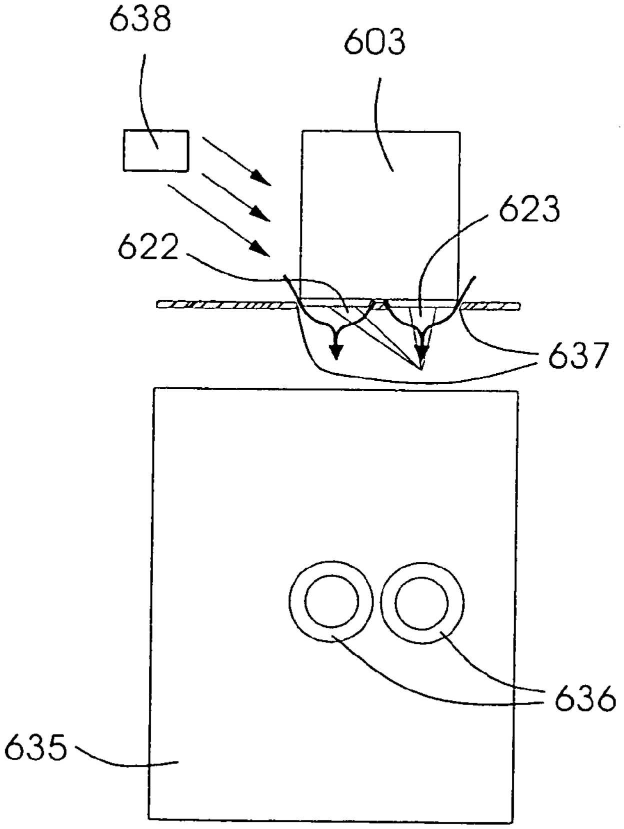
Figure 12D:
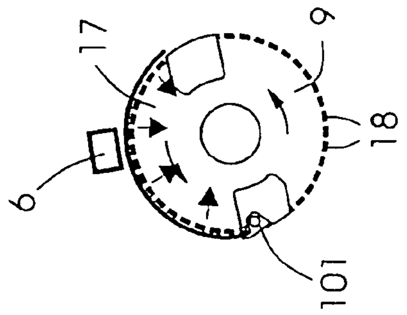
FIG. 12D shows sheets held by vacuum during the measuring operation.
Figure 12C:
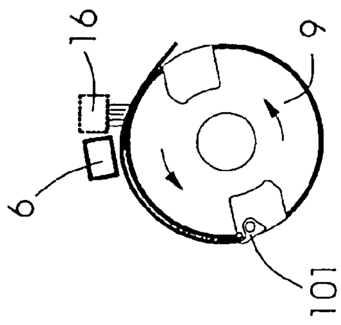
FIG. 12C shows sheets held by grippers and a blowing device during the measuring operation.
Figure 12B:
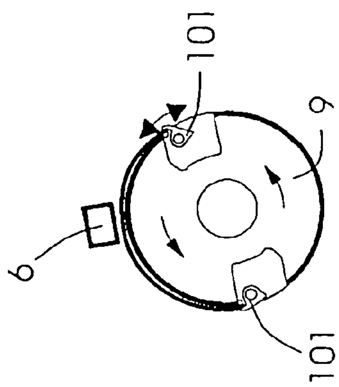
FIG. 12B shows sheets held by two grippers during the measuring operation.
Figure 12A:
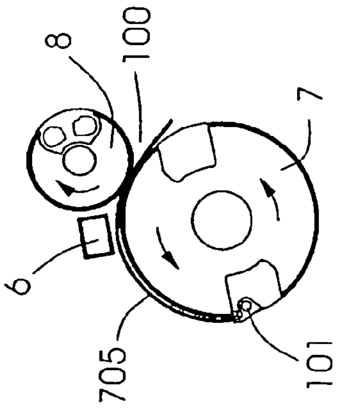
FIG. 12A shows sheets held by grippers and press nip during the measuring operation.

An alternative embodiment to FIG. 10 is shown by FIG. 11. Here, too, a measuring carriage 605 that can be moved is located in a measuring beam 6, but the measuring beam is open at the bottom, for which reason the measuring carriage 605 is closed by a base 635. For this purpose, the measuring carriage 605 has a base 635 made of sheet metal, which is additionally provided with glass viewing openings 636. The glass openings 636 are positioned exactly under the beam paths of the measuring modules 603. Therefore, in FIG. 11 with 8 measuring modules 603 on the measuring carriage 605, exactly 16 glass viewing openings 636 are provided underneath the 8 measuring heads 622 and 8 illuminating modules 623. The glass openings 636 can be circular, as in FIG. 11, but can also be oval, rectangular or configured in another shape. In addition to the glass viewing openings 636, in the base 635 of the measuring carriage there are also small blast air ducts 637, through which blast air can escape from the interior of the measuring carriage 605. This blast air is used for the purpose of keeping the printing material 705 at a distance from the base 635, in order to avoid contact with the sheet 705 and therefore contamination of the glass openings 636. At the same time, by means of the positive pressure produced in the interior of the measuring carriage 605 by the blast air, foreign bodies are prevented from penetrating into the interior of the measuring carriage 605 from outside. Blast air is applied to the blast air ducts 637 by means of a blast air source 638, for example a small compressor or fan in the interior of the measuring carriage 605.

FIGS. 12A, 12B, 12C and 12D show various possible ways of fixing the printing material 705 during the measuring operation by the measuring beam 6 in a sheet-fed rotary printing press 1. In addition to the possibility known from FIG. 1 in FIG. 12A, of fixing the printing material 705 at its one end by means of a sheet transport gripper 101 and at its other end by the press nip 100 between impression cylinder 7 and blanket cylinder 8, there are further possible ways of fixing the sheet 705 even when it is not in the press nip 100. According to FIG. 12B, a sheet 705 is held at both ends by transport grippers 101 on a transport cylinder 9 and in this way is fixed under the measuring beam 6 during the measurement. Instead of at least the transport gripper 101 trailing in the sheet transport direction, a blowing device 16 can also be installed above the transport cylinder 9, as in FIG. 12C, which presses the free end of the sheet 705 not fixed in a gripper onto the transport cylinder 9 and thus fixes it. Furthermore, a solution according to FIG. 12D can also be employed. In this solution, the sheet 705 is fixed on the transport cylinder 9 substantially by means of vacuum. To this end, on the cylinder surface which comes into contact with the sheet 705, the cylinder 9 has a plurality of air openings 18 which are connected to a vacuum chamber 17 in the interior of the cylinder 9. The vacuum fixes the sheet 705 on the cylinder in this way, which can additionally be assisted by a transport gripper 101, but does not have to be. The vacuum chamber 17 can be constituent part of a suction pump in the interior of the cylinder 9 or can be connected to a suction pump outside the cylinder 9.

Figure 13:
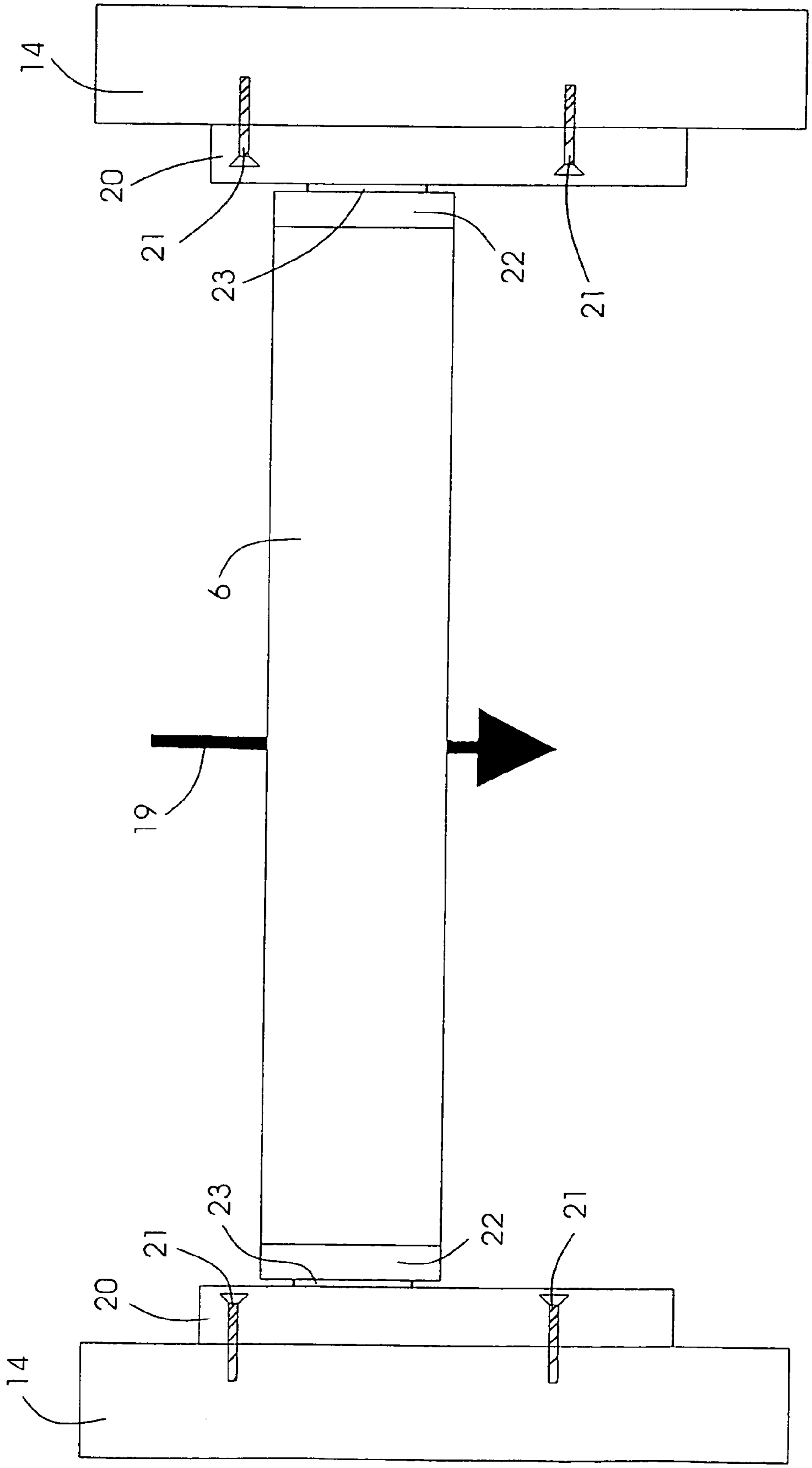
FIG. 13 shows the fixing of the measuring beam in the printing unit of a printing press.

FIG. 13 explains, how the measuring beam 6 is mounted in a printing unit of a printing press 1. In the plan view of the installation location in the printing press 1, it can be seen that the measuring beam 6 is in principle installed transversely with respect to the sheet transport direction 19, between the side walls 14 of the printing press 1. Since the intention is that the measuring beam 6 can also be retrofitted in already existing machines, the mounting is made via two lateral mounting plates 20, which can in principle be installed in any printing press 1 as long as there is the necessary space. The mounting plates 20 can also compensate for different distances between the side walls 14, by being designed to be of different thicknesses. The mounting plates 20 are fixed to the side walls 14 by means of mounting screws 21 and carry the mounting for the measuring beam 6. At both its ends, the measuring beam 6 has covers 22 in each case, which enclose the measuring beam 6 and carry bearings 23. These bearings 23 support the measuring beam 6 with respect to the mounting plates 20 and reduce vibrations which the printing press 1 would transmit to the measuring beam 6. The covers 22 can be configured in such a way that the measuring beam 6 can be removed simply from the covers 22.

We claim:

1. A method for detecting spectral, densitometric or color measured values on sheet printing materials during a printing process in a sheet-fed printing press wherein sheets are moved through the printing press, the method which comprises:

determining the measured values on sheets moving through the printing press;

calibrating sensors for picking up the measured values with a calibration device at specific time intervals for color calibration, the computer having one or more calibration surfaces with associated measured values stored therein, and the calibration surfaces being used as reference values for the calibration device, the sensors being measuring heads;

converting calibration values determined by a calibration of a given measuring head, by way of the computer, into calibration values for further measuring heads; and processing the measured values in a computer and using the processed values as control parameters for controlling the printing process of the sheet-fed printing press.

2. The method according to claim 1, which comprises using the measured values with a computer as control parameters for producing printing forms in a prepress stage.

3. The method according to claim 1, which comprises using the measured values in a computer to create a color profile for driving inking units of a printing press.

4. The method according to claim 1, which comprises using the measured values in a computer to set up the printing press during the setup phase.

5. The method according to claim 1, which comprises using the measured values in a computer to set the printing press in real-time during the continuous printing phase.

6. The method according to claim 1, which comprises providing at least one white tile as a reference value for the calibration device.

7. The method according to claim 1, which comprises providing one or more calibration surfaces in a channel of a press cylinder, in extension of a press cylinder surface.

8. The method according to claim 1, which comprises placing at least one calibration tile laterally outside a press cylinder surface, between a side wall and a press cylinder.

9. The method according to claim 1, which comprises transporting a sheet printing material having known spectral measured values through the printing press and measuring the printing material with the measuring sensors as a spectral reference for calibration prior to a start of printing.

10. The method according to claim 1, wherein a transfer calibration is carried out by sensing, with a calibrated measuring head, a measuring area of a yet uncalibrated measuring head that has been sensed by the uncalibrated measuring head.

11. The method according to claim 1, which comprises providing at least one calibration tile with a selectively closable cover.

12. The method according to claim 1, which comprises calibrating with an external measuring device.

13. The method according to claim 1, which comprises storing specific color values in a computer for each measuring head, storing ratios between the specific color values in the computer, and outputting a signal if a change in the stored measured value ratios is detected.

14. The method according to claim 1, wherein the sensors are measuring heads and the method further comprises registering, with a first measuring head, a first inking zone and a second inking zone assigned to a second measuring head adjacent the first measuring head, and registering, with the second measuring head, the second inking zone and the first inking zone of the first measuring head, and comparing the measured values with one another.

15. The method according to claim 1, wherein the sensors are measuring heads, an illuminating device is disposed in the printing press, and the method further comprises: carrying out a dark measurement before an actual measurement with a measuring head, and subtracting a measured value obtained in the dark measurement from a color measurement value carried out with the illuminating device switched on.

16. The method according to claim 1, which comprises, during an acquisition of measured values on the printing material by one or more sensors, switching off, masking, or dimming to a non-critical level any light sources that are present.

17. The method according to claim 1, which comprises, during an acquisition of measured values on the printing material, matching a measuring period and a measuring process of the measuring heads to any light sources that are present.

18. The method according to claim 1, which comprises coordinating an acquisition of measured values by measuring heads with any fluctuations of light sources over time by way of at least one sensor registering the fluctuations.

19. The method according to claim 1, which comprises coordinating an acquisition of measured values by measuring heads with any fluctuations of light sources over time by way of a control signal of the fluctuating light source.

20. The method according to claim 1, wherein the sensors are a plurality of measuring heads distributed at equal intervals over a width of the printing material, and the method further comprises registering inking zones simultaneously with the plurality of measuring heads.

21. The method according to claim 20, which comprises, after each measurement, offsetting the measuring heads by one inking zone.

22. The method according to claim 1, wherein the sensors are a plurality of measuring heads and the method comprises, during a printing operation and after the printing start-up phase, positioning the measuring heads to register a plurality of colors simultaneously.

23. The method according to claim 1, which comprises storing, with the computer, position coordinates of print control strips applied to a printing material.

24. The method according to claim 23, which comprises providing a sensor for determining the position of a print control strip on the printing material.

25. The method according to claim 1, which comprises subjecting measured values of each measurement by the sensors to a plausibility test.

26. The method according to claim 25, wherein the sensors are measuring heads and the method comprises subjecting each measurement of each measuring head to the plausibility test.

27. A method for detecting spectral, densitometric or color measured values on sheet printing materials during a printing process in a sheet-fed printing press wherein sheets are moved through the printing press, the method which comprises:

determining the measured values on sheets moving through the printing press;

processing the measured values in a computer and using the processed values as control parameters for controlling the printing process of the sheet-fed printing press; and providing sensors being measuring heads and in at least one inking zone, carrying out measurements with a measuring head on a light/dark edge and thereby moving the measuring head in uniform steps from one side of the light/dark edge over the light/dark edge to the other side of the light/dark edge, and comparing the intensity measured values thereby registered with a known structure of the measuring head.

28. A method for detecting spectral, densitometric or color measured values on sheet printing materials during a printing process in a sheet-fed printing press wherein sheets are moved through the printing press, the method which comprises:

determining the measured values on sheets moving through the printing press;

processing the measured values in a computer and using the processed values as control parameters for controlling the printing process of the sheet-fed printing press; and providing sensors being measuring heads and simultaneously with a color measurement of a first measuring head, registering a measured value on a white background of a printing material with a second measuring head and determining therefrom a white reference value and using the white reference value to correct the color measured values determined with the first measuring head.

* * * * *